United States Patent
Tada et al.

(10) Patent No.: US 10,703,844 B2
(45) Date of Patent: Jul. 7, 2020

(54) CURABLE COMPOSITION

(71) Applicant: FUJIFILM Corporation, Tokyo (JP)

(72) Inventors: Yuko Tada, Kanagawa (JP); Akihito Amao, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 322 days.

(21) Appl. No.: 15/843,065

(22) Filed: Dec. 15, 2017

(65) Prior Publication Data

US 2018/0105629 A1  Apr. 19, 2018

Related U.S. Application Data

(63) Continuation of application No. PCT/JP2016/070901, filed on Jul. 14, 2016.

(30) Foreign Application Priority Data

Jul. 17, 2015 (JP) ................. 2015-143131

(51) Int. Cl.
  *C08F 222/38* (2006.01)
(52) U.S. Cl.
  CPC ................. *C08F 222/385* (2013.01)
(58) Field of Classification Search
  CPC .................................. C08F 222/385
  USPC ....................................... 526/304
  See application file for complete search history.

(56) References Cited

U.S. PATENT DOCUMENTS

| | | |
|---|---|---|
| 6,585,873 B1 | 7/2003 | Solomon et al. |
| 2011/0205291 A1 | 8/2011 | Yasuda et al. |

FOREIGN PATENT DOCUMENTS

| | | | |
|---|---|---|---|
| EP | 2894175 A1 | 7/2015 | |
| JP | 2013-194023 A | 9/2013 | |
| JP | 2013-194024 A | 9/2013 | |
| JP | 2013194023 | * | 9/2013 |
| JP | 2013194024 | * | 9/2013 |
| JP | 5591857 B2 | 9/2014 | |
| JP | 5591858 B2 | 9/2014 | |
| JP | 5611858 B2 | 10/2014 | |

OTHER PUBLICATIONS

International Search Report for PCT/JP2016/070901 dated Sep. 27, 2016 [PCT/ISA/210].
International Preliminary Report on Patentability with Translation of Written Opinion dated Jan. 23, 2018 in counterpart international application No. PCT/JP2016/070901.
Written Opinion dated Sep. 27, 2016 in counterpart international application No. PCT/JP2016/070901.
Communication dated May 11, 2018, from the European Patent Office in counterpart European Application No. 16827721.8.
Patras G et al. "Synthesis, Characterization, and Modelling of Novel Multifunctional Acryloyl-Based Monomers: An Experimental and Computational Study*", Aust. J. Chem., May 29, 2002, pp. 675-680 (6 pages total).

* cited by examiner

*Primary Examiner* — Hui H Chin
(74) *Attorney, Agent, or Firm* — Sughrue Mion, PLLC

(57) ABSTRACT

Provided is a curable composition in which the solubility in a solvent (in particular, water) is high and in which properties of a cured film obtained using the curable composition stored for a predetermined time are superior. The curable composition includes: a compound A represented by Formula (A) and at least one compound X selected from the group consisting of compounds represented by Formulae (X1) to (X4), in which a content of the compound X is 0.01 to 2.0 mass % with respect to a total mass of the compound A and the compound X; or a compound B represented by Formula (B) and a compound Y represented by Formula (Y), in which a content of the compound Y is 0.01 to 2.0 mass % with respect to a total mass of the compound B and the compound Y.

6 Claims, No Drawings

US 10,703,844 B2

CURABLE COMPOSITION

CROSS-REFERENCE TO RELATED APPLICATIONS

This application is a Continuation of PCT International Application No. PCT/JP2016/070901 filed on Jul. 14, 2016, which claims priority under 35 U.S.C. § 119(a) to Japanese Patent Application No. 2015-143131 filed on Jul. 17, 2015. The above application is hereby expressly incorporated by reference, in its entirety, into the present application.

BACKGROUND OF THE INVENTION

1. Field of the Invention

The present invention relates to a curable composition.

2. Description of the Related Art

A composition (curable composition) that is cured by applying energy of light or heat thereto has been widely used for industrial usage such as a coating agent, a paint, a printing ink, an adhesive, an optical material, a laminating material of an electronic product, an electrical insulating material, or a resist material.

As a curable compound included in the curable composition, various polymerizable compounds have been investigated. In particular, a (meth)acrylamide compound has been actively investigated.

For example, JP5591858B and JP5591857B disclose a compound that is a precursor for obtaining a (meth)acrylamide compound having a predetermined structure, and Examples thereof describe that the (meth)acrylamide compound having a predetermined structure was obtained through the compound that is the precursor.

In addition, JP5611858B discloses an aqueous ink composition including a (meth)acrylamide compound having a predetermined structure, and Examples thereof describe that the (meth)acrylamide compound having a predetermined structure was synthesized.

SUMMARY OF THE INVENTION

In a curable composition, various properties are required. For example, in order to prepare a coating solution including a solvent, it is preferable that the solubility of a curable composition in the solvent is high from the viewpoint of industrial productivity. In particular, recently, it has been recommended to use water as a solvent from the viewpoint of environmental protection. Therefore, it is preferable that the solubility of a curable composition in water is high. In a case where the solubility is low, a long time is required to dissolve the curable composition in the solvent, and thus the industrial productivity is poor. In addition, in a case where a part of the curable composition is not completely dissolved to become insoluble matter, there is a concern that properties (for example, a surface shape) of a cured product obtained using a coating solution including the insoluble matter may be poor.

The present inventors performed an investigation on the solubility of a curable composition which is formed of a (meth)acrylamide compound obtained using a method disclosed in JP5591858B and JP5591857B, and found that the solubility does not necessarily satisfy the recently required level and is required to be further improved.

In addition, regarding other properties required for a curable composition, for example, a curable composition is used after being stored for a predetermined time in many cases, and it is required that properties of a cured film formed using the curable composition stored for a predetermined time are superior. More specifically, it is required that the haze of a cured product is not poor and that the cured product does not include foreign matter such as solid matter.

The present inventors formed a cured film using a (meth)acrylamide compound which was synthesized using a method specifically disclosed in JP5611858B and stored for a predetermined time. In the obtained cured film, deterioration in haze or incorporation of foreign matter such as solid matter was found, and further improvement is required.

The present invention has been made in consideration of the above-described circumstances, and an object thereof is to provide a curable composition in which the solubility in a solvent (in particular, water) is high and in which properties of a cured film obtained using the curable composition stored for a predetermined time are superior.

As a result of thorough investigation to achieve the object, the present inventors found that the object can be achieved by the following configurations.

(1) A curable composition comprising:
a compound A represented by the following Formula (A) and at least one compound X selected from the group consisting of compounds represented by the following Formulae (X1) to (X4), in which a content of the compound X is 0.01 to 2.0 mass % with respect to a total mass of the compound. A and the compound X; or
a compound B represented by the following Formula (B) and a compound Y represented by the following Formula (Y), in which a content of the compound Y is 0.01 to 2.0 mass % with respect to a total mass of the compound B and the compound Y.

(2) The curable composition according to (1),
in which the content of the compound X is 0.1 to 1.0 mass %, and
the content of the compound Y is 0.1 to 1.0 mass %.

(3) The curable composition according to (1) or (2),
in which the compound A represented by Formula (A) includes at least one compound selected from the group consisting of compounds represented by the following Formulae (A-1) to (A-4), and
the compound B represented by Formula (B) includes a compound represented by the following Formula (B-1).

(4) The curable composition according to (3),
in which any one of the following requirements 1 to 5 is satisfied,
requirement 1: the curable composition includes the compound represented by Formula (A-1) as the compound A and includes at least one compound selected from the group consisting of compounds represented by the following Formulae (DA1-1) to (DA1-4) as the compound X,
requirement 2: the curable composition includes the compound represented by Formula (A-2) as the compound A and includes at least one compound selected from the group consisting of compounds represented by Formulae (D A2-1) to (DA2-4) as the compound X,
requirement 3: the curable composition includes the compound represented by Formula (A-3) as the compound A and includes at least one compound selected from the group consisting of compounds represented by Formulae (DA3-1) to (DA3-8) as the compound X,
requirement 4: the curable composition includes the compound represented by Formula (A-4) as the compound A and includes at least one compound selected from the group consisting of compounds represented by Formulae (DA4-1) to (DA4-4) as the compound X, and requirement 5: the curable composition includes the compound represented by Formula (B-1) as the compound A and includes a compound represented by Formula (DB1-1) as the compound Y.

According to the present invention, a curable composition can be provided in which the solubility in a solvent (in particular, water) is high and in which properties of a cured film obtained using the curable composition stored for a predetermined time are superior.

DESCRIPTION OF THE PREFERRED EMBODIMENTS

Hereinafter, a curable composition according to the present invention will be described.

In this specification, numerical ranges represented by "to" include numerical values before and after "to" as lower limit values and upper limit values.

In addition, in this specification, "(meth)acrylamide" is the term including both acrylamide and methacrylamide. That is, "(meth)acrylamide compound" is the term including both an acrylamide compound and a methacrylamide compound.

The present invention is characterized in that, for example, a predetermined (meth)acrylamide compound is used in combination with a predetermined compound.

The present inventors performed an investigation on problems of the techniques of the related art, the present inventors found that the reason why the solubility of the (meth)acrylamide compound disclosed in JP5591858B and JP5591857B in a solvent is low is that the crystallinity of the (meth)acrylamide compound is high and the solubility thereof in a solvent decreases due to the high crystallinity. The present inventors performed a further investigation based on the finding and conceived a method of using a predetermined amount of a compound represented by any one of the following Formulae (X1) to (X4) or a compound represented by Formula (Y) (hereinafter, also collectively referred to as "specific additive") as means for decreasing the crystallinity. That is, by adding a predetermined amount of the specific additive to a (meth)acrylamide compound, the crystallinity of the (meth)acrylamide compound decreases, and the solubility thereof in a solvent can be improved. As described below, a structure of the specific additive has many structurally similar portions to that of a (meth)acrylamide compound (a compound A represented by Formula (A) or a compound B represented by Formula (B)) to be used. Therefore, it is presumed that the above-described effects can be obtained.

In addition, the present inventors found that the reason why the properties of the cured film, which is formed using the (meth)acrylamide compound disclosed in JP5611858B stored for a predetermined time, are poor relates to the specific additive. More specifically, in the method of synthesizing the (meth)acrylamide compound described in JP5611858B, the obtained (meth)acrylamide compound includes a large amount of the specific additive. The stability of the specific additive used for improving the solubility as described above is not necessarily high. In addition, in a case where the curable composition including the specific additive is stored for a predetermined time, a polymerization reaction of the specific additive progresses, and the specific additive becomes insoluble matter which is insoluble in a solvent or the like. This insoluble matter causes deterioration in haze or incorporation of foreign matter such as solid matter in the formed cured film. Therefore, the present inventors adjust the content of the specific additive so as to suppress the deterioration in the properties of the cured product.

Examples of the curable composition according to the present invention include curable compositions according to the following two aspects.

Aspect 1: a curable composition including a compound A represented by the following Formula (A) and at least one compound X selected from the group consisting of compounds represented by the following Formulae (X1) to (X4), in which a content of the compound X is in a predetermined range.

Aspect 2: a curable composition including a compound B represented by the following Formula (B) and a compound Y represented by the following Formula (Y), in which a content of the compound Y is in a predetermined range.

Hereinafter, first, various components included in the curable composition will be described in detail.

<Compound A Represented by Formula (A) ((Meth) acrylamide Compound A)>

The compound. A is a compound represented by the following Formula (A).

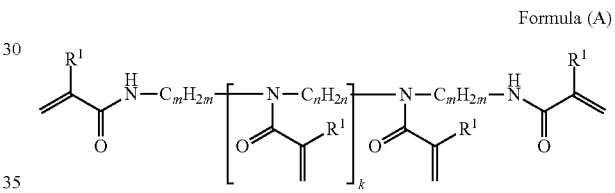

Formula (A)

In Formula (A), $R^1$ represents a hydrogen atom or a methyl group. $R^1$ represents preferably a hydrogen atom. A plurality of $R^1$'s may be the same as or different from each other and is preferably the same as each other.

m represents an integer of 2 to 4. A plurality of m's may be the same as or different from each other and is preferably the same as each other. In addition, a carbon chain represented by $C_mH_{2m}$ may be linear or branched and is preferably linear.

n represents an integer of 2 to 4. In addition, a carbon chain represented by $C_nH_{2n}$ may be linear or branched and is preferably linear.

k represents 0 or 1.

Among these, from the viewpoint of further improving at least one of the solubility of the curable composition or the properties of the formed cured product (hereinafter, also simply referred to as "from the viewpoint of further improving the effects of the present invention"), Preferable examples of the compound A include compounds represented by Formulae (A-1) to (A-4).

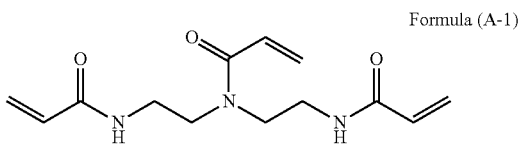

Formula (A-1)

Formula (A-2)

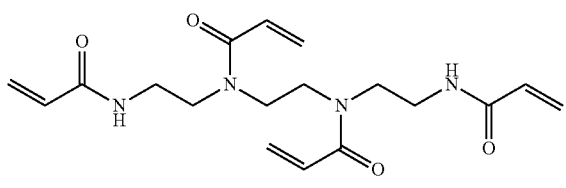

Formula (A-3)

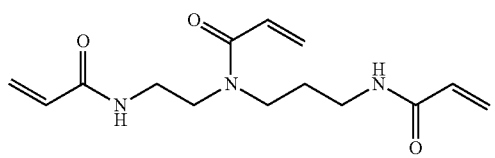

Formula (A-4)

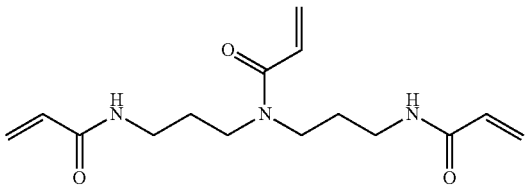

The compound A may be a commercially available product or may be synthesized using a well-known method.

<Compound X>

The compound X array be at least one selected from the group consisting of a compound represented by Formula (X1), a compound represented by Formula (X2), a compound represented by Formula (X3), and a compound represented by Formula (X4). The compound X has a similar structure to that of the compound A, and thus has high compatibility with the compound A. As a result, the crystallization of the compound A is suppressed.

Formula (X1)

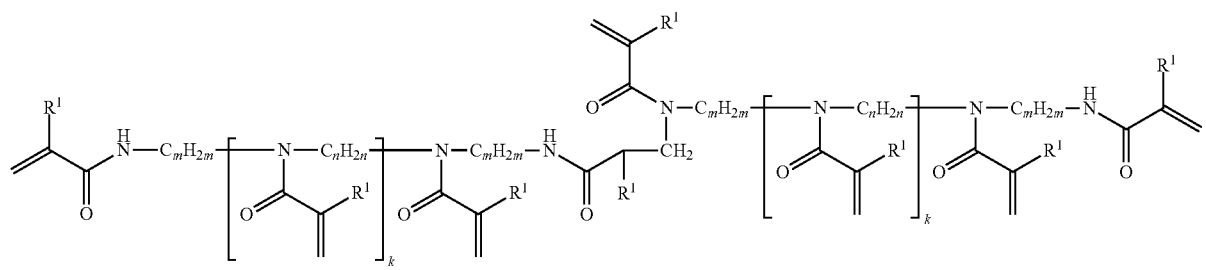

Formula (X2)

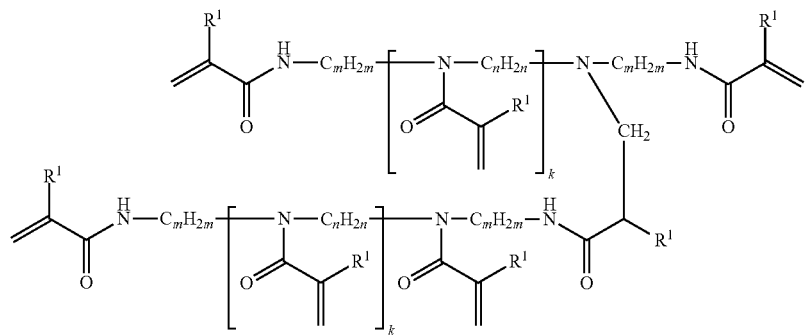

Formula (X3)

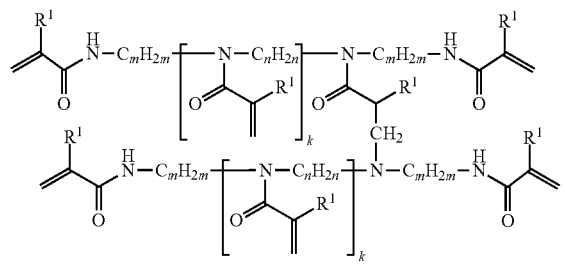

Formula (X4)

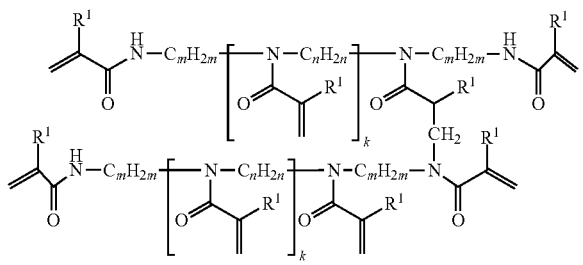

In Formulae (X1) to (X4), the definitions of $R^1$, m, n, and k are the same as those of the respective groups in Formula (A).

A plurality of $R^1$'s, a plurality of a plurality of n's, and a plurality of k's may be the same as or different from each other.

Mainly, the compound X corresponds to a by-product produced during the synthesis of the compound A. For example, in a case where the compound A is synthesized by causing an amine compound to react with a chloride compound such as acryloyl chloride or methacryloyl chloride, the compound X is produced through a Michael addition reaction that progresses as a side reaction. The Michael addition reaction refers to a reaction of 1,4-addition of a nucleophilic agent to an α,β-unsaturated carbonyl compound.

More specifically, for example, in a case where a compound A1 is synthesized by causing diethylenetriamine to react with acryloyl chloride, according to the following scheme, an intermediate B is produced through a Michael addition reaction of an α,β-unsaturated carbonyl group, which is surrounded by a broken line in the compound A1, and a first amino group in an intermediate A which is a reaction intermediate of the compound A1. Next, acryloyl chloride further reacts with a second amino group in the intermediate B to obtain a compound represented by Formula (DA1-1).

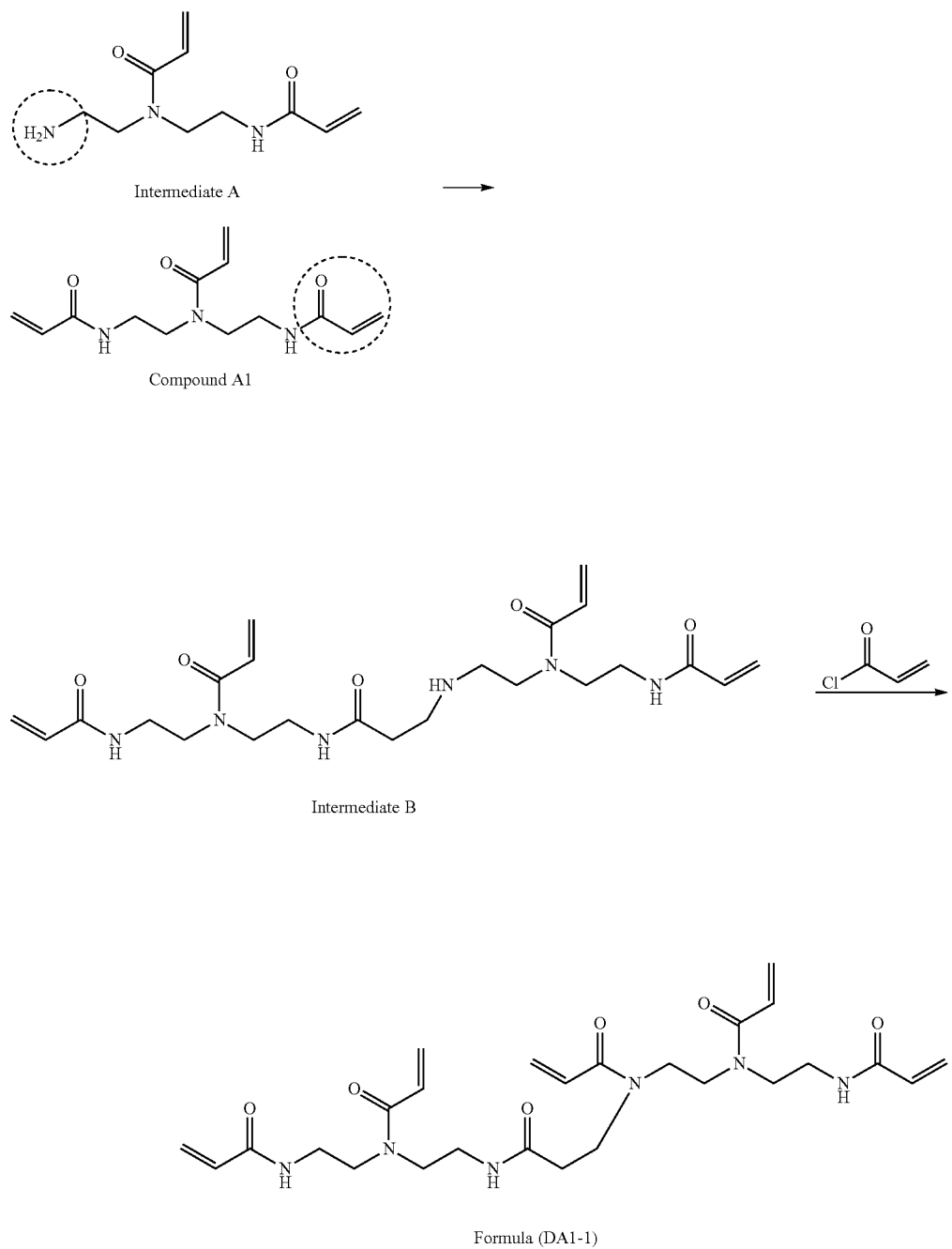

In addition, in addition to the above-described scheme, for example, according to the following scheme, an intermediate C is produced through a Michael addition reaction of an α,β-unsaturated carbonyl group, which is surrounded by a broken line in the compound A1, and a first amino group in diethylenetriamine which is a starting material. Next, acryloyl chloride further reacts with a first amino group in the intermediate C to obtain a compound represented by Formula (DA1-2).

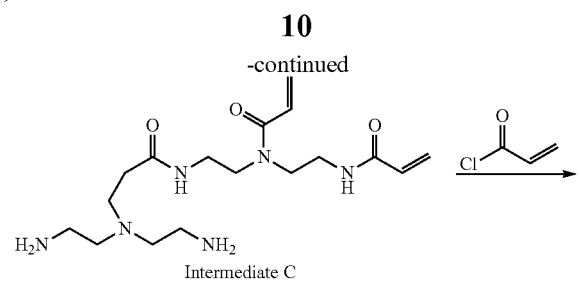

Intermediate C

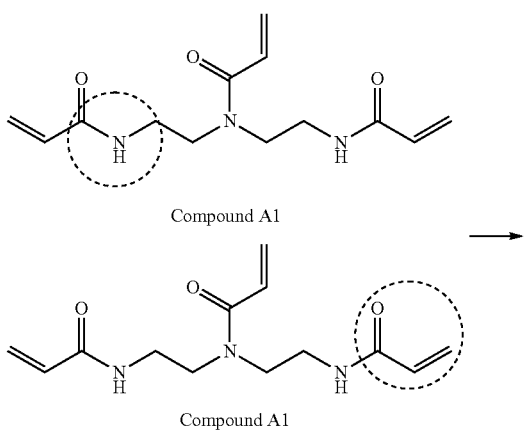

Compound A1

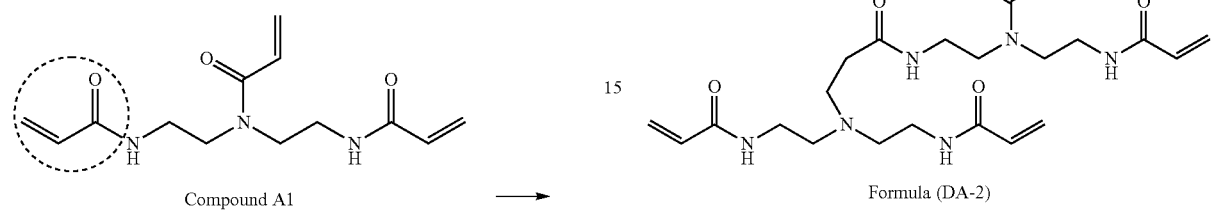

Formula (DA-2)

Further, according to the following scheme, the compound represented by Formula (DA1-1) may also be obtained through a Michael addition reaction of an α,β-unsaturated carbonyl group, which is surrounded by a broken line in one compound A1, and an NH group which is surrounded by a broken line in another compound A1.

Compound A1

Compound A1

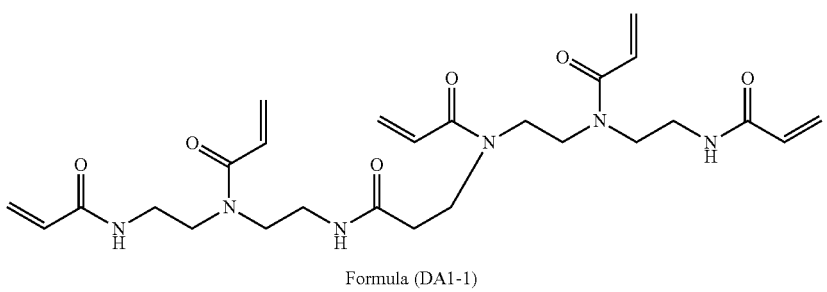

Formula (DA1-1)

In particular, examples of the compound X which is preferably used in combination with the compound represented by Formula (A-1) include compounds represented by Formulae (DA1-1) to (DA1-4).

In addition, examples of the compound X which is preferably used in combination with the compound represented by Formula (A-2) include compounds represented by Formulae (DA2-1) to (DA2-4).

In addition, examples of the compound X which is preferably used in combination with the compound represented by Formula (A-3) include compounds represented by Formulae (DA3-1) to (DA3-8).

In addition, examples of the compound X which is preferably used in combination with the compound represented by Formula (A-4) include compounds represented by Formulae (DA4-1) to (DA4-4).

Formula (DA1-1)

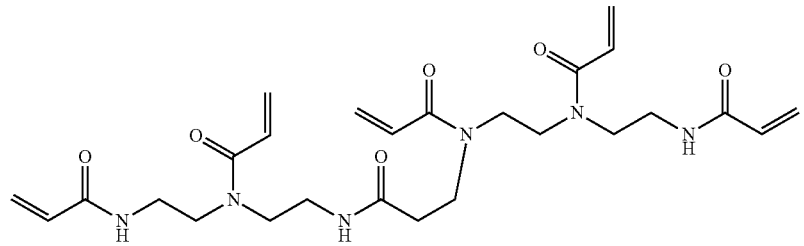

Formula (DA1-2)

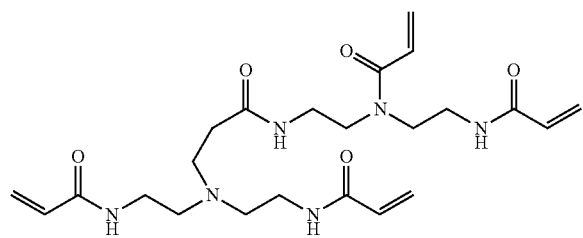

Formula (DA1-3)

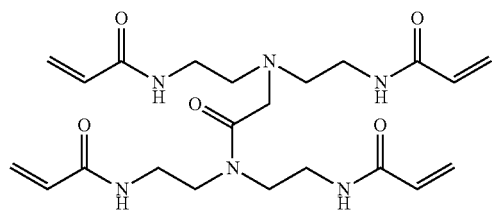

Formula (DA1-4)

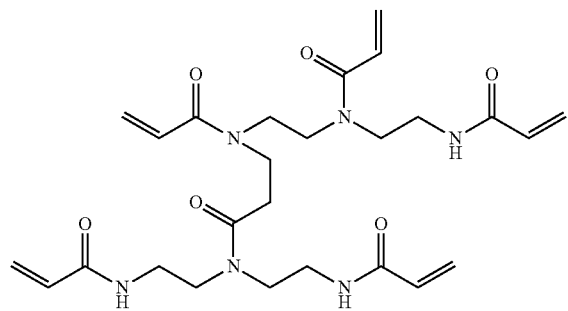

Formula (DA2-1)

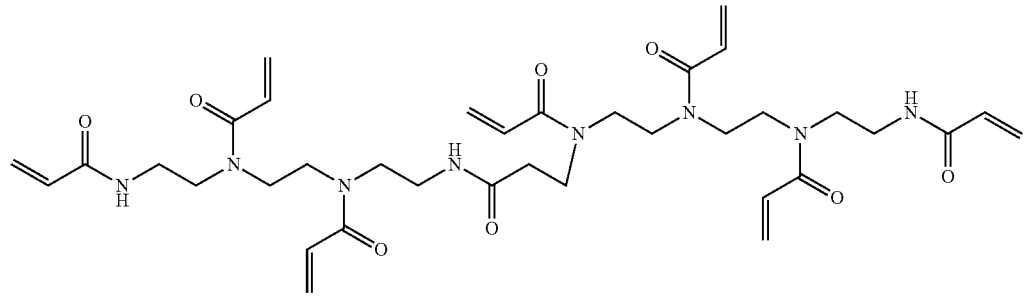

Formula (DA2-2)
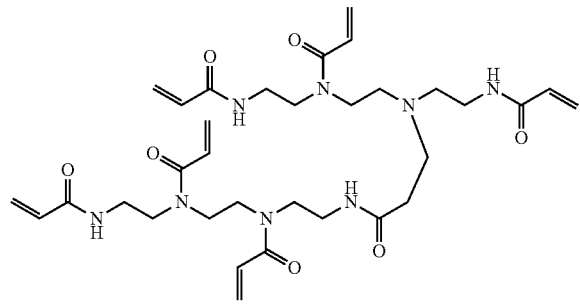
Formula (DA2-3)
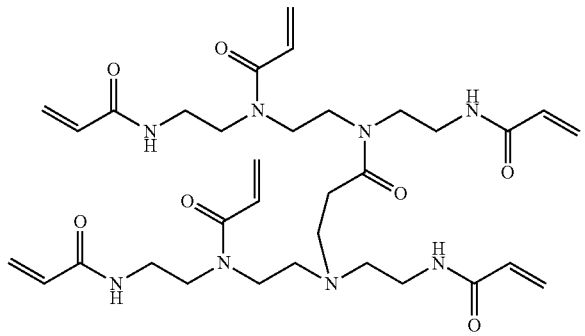
Formula (DA2-4)
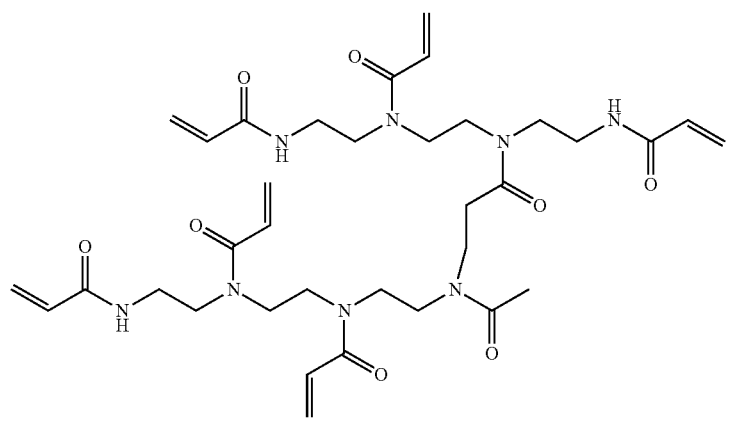
Formula (DA3-1)
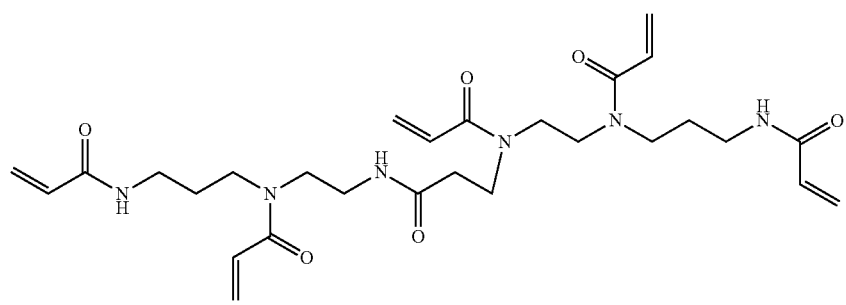
Formula (DA3-2)
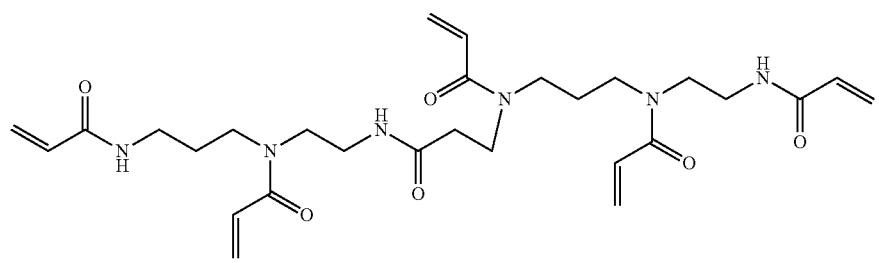
Formula (DA3-3)
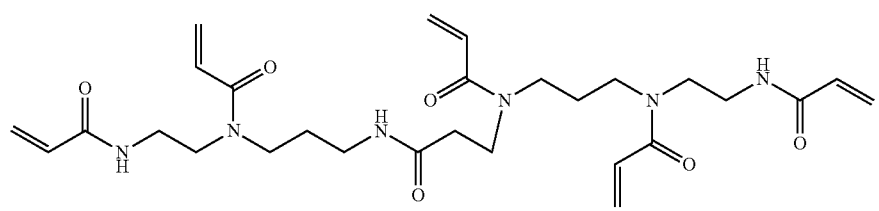

-continued
Formula (DA3-4)
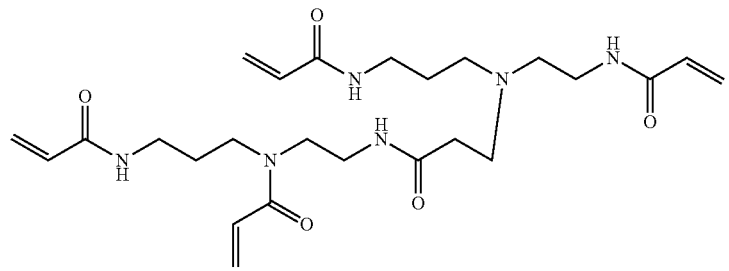
Formula (DA3-5)
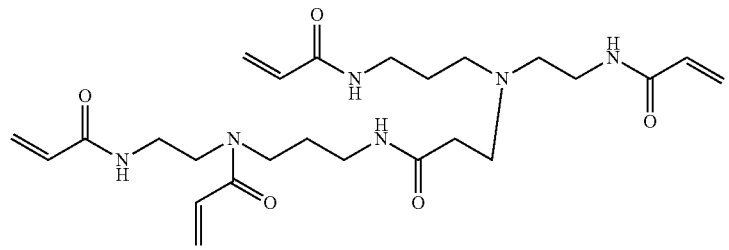
Formula (DA3-6)
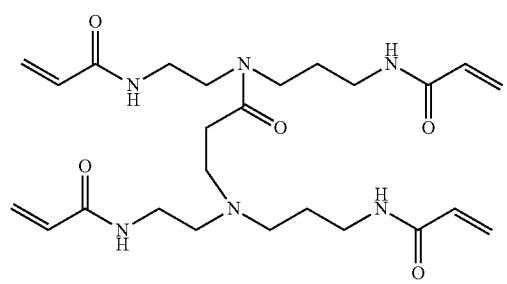
Formula (DA3-7)
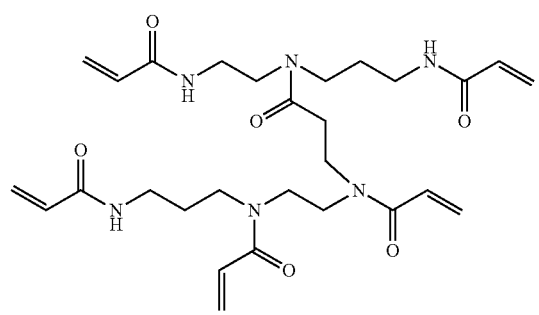
Formula (DA3-8)
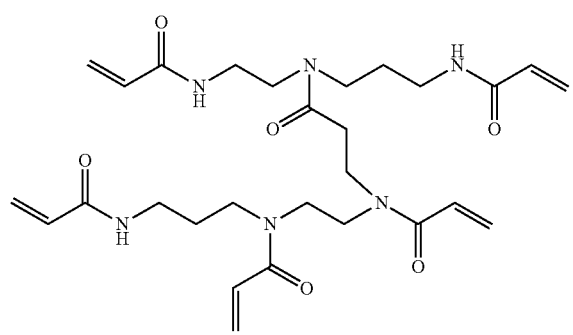
Formula (DA4-1)
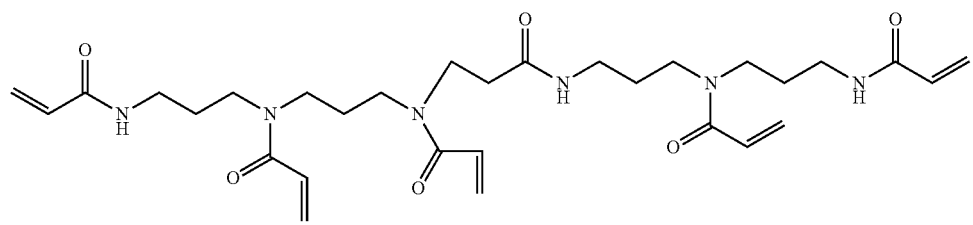

-continued

Formula (DA4-2)

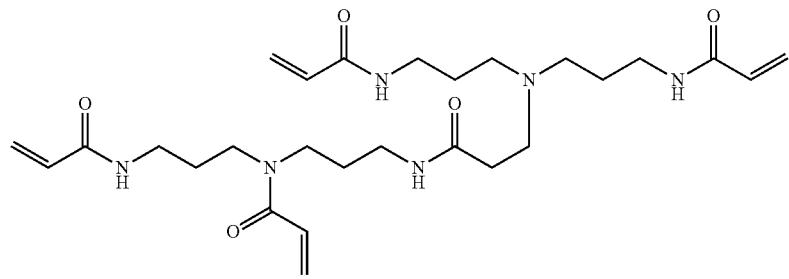

Formula (DA4-3)

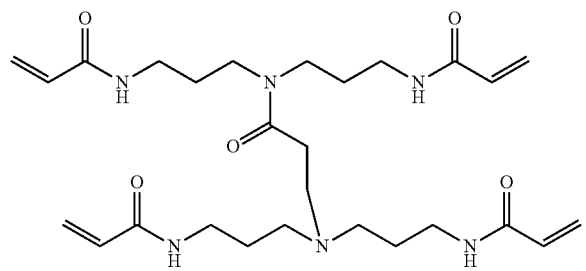

Formula (DA4-4)

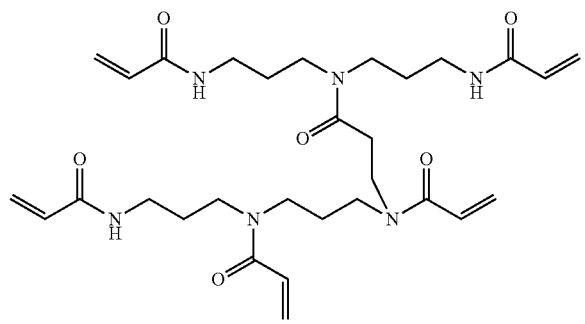

The compound X can be synthesized using a well-known method. For example, as described above, in a case where an amine compound such as diethylenetriamine is caused to react with acryloyl chloride or methacryloyl chloride for amidation, the reaction temperature is set to be 40° C. or higher to accelerate the Michael addition reaction as a side reaction. Next, the compound X is collected from the obtained product using column chromatography.

<Compound B Represented by Formula (B) ((Meth) acrylamide Compound B)>

The compound B is a compound represented by the following Formula (B).

Formula (B)

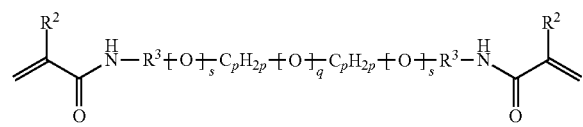

In Formula (B), $R^2$ represents a hydrogen atom or a methyl group. $R^2$ represents preferably a hydrogen atom. A plurality of $R^2$'s may be the same as or different from each other and is preferably the same as each other. $R^2$ in the following $R^3$ also has the same definition as described above.

$R^3$ represents $-CH_2CH(R^2)CH_2-$ or $-CH_2CH_2-$. A plurality of $R^3$'s may be the same as or different from each other and is preferably the same as each other.

s represents 1.

q represents 0 or 1. It is preferable that q represents 1.

p represents an integer of 2 to 6. It is preferable that p represents an integer of 2 to 4. A plurality of p's may be the same as or different from each other and is preferably the same as each other. In addition, a carbon chain represented by $C_pR_{2p}$ may be linear or branched and is preferably linear.

In particular, from the viewpoint of further improving the effects of the present invention, examples of the compound B include a compound represented by Formula (B-1).

Formula (B-1)

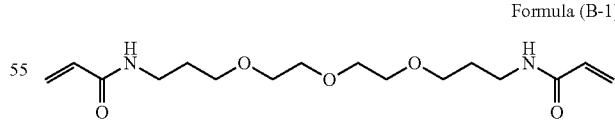

The compound B may be a commercially available product or may be synthesized using a well-known method.

<Compound Y>

The compound Y is a compound represented by the following Formula (Y). The compound Y has a similar structure to that of the compound B, and thus has high compatibility with the compound B.

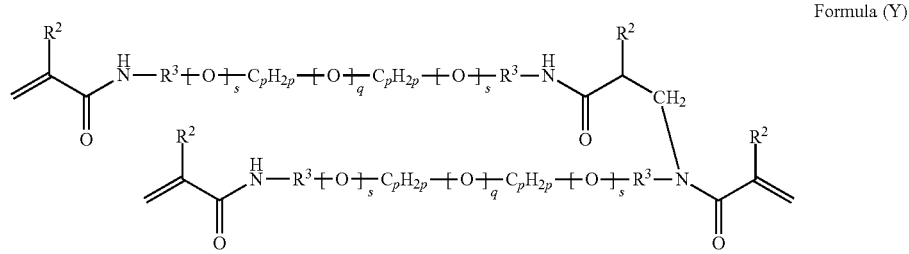

Formula (Y)

In Formula (Y), the definitions of $R^2$, $R^3$, s, q, and p are the same as those of the respective groups in Formula (B).

A plurality of $R^2$'s, a plurality of $R^3$'s, a plurality of s's, a plurality of q's, and a plurality of p's may be the same as or different from each other.

Mainly, the compound Y corresponds to a by-product produced during the synthesis of the compound B. For example, in a case where the compound B is synthesized by causing an amine compound to react with a chloride compound such as acryloyl chloride or methacryloyl chloride, the compound Y is produced through a Michael addition reaction that progresses as a side reaction.

More specifically, for example, in a case where a compound B1 is synthesized by causing 4,7,10-trioxa-1,13-tridecanediamine to react with acryloyl chloride, according to the following scheme, an intermediate E is produced through a Michael addition reaction of an α,β-unsaturated carbonyl group, which is surrounded by a broken line in the compound B1, and a first amino group in an intermediate D which is a reaction intermediate of the compound B1. Next, acryloyl chloride further reacts with a second amino group in the intermediate E to obtain a compound represented by Formula (DB1-1).

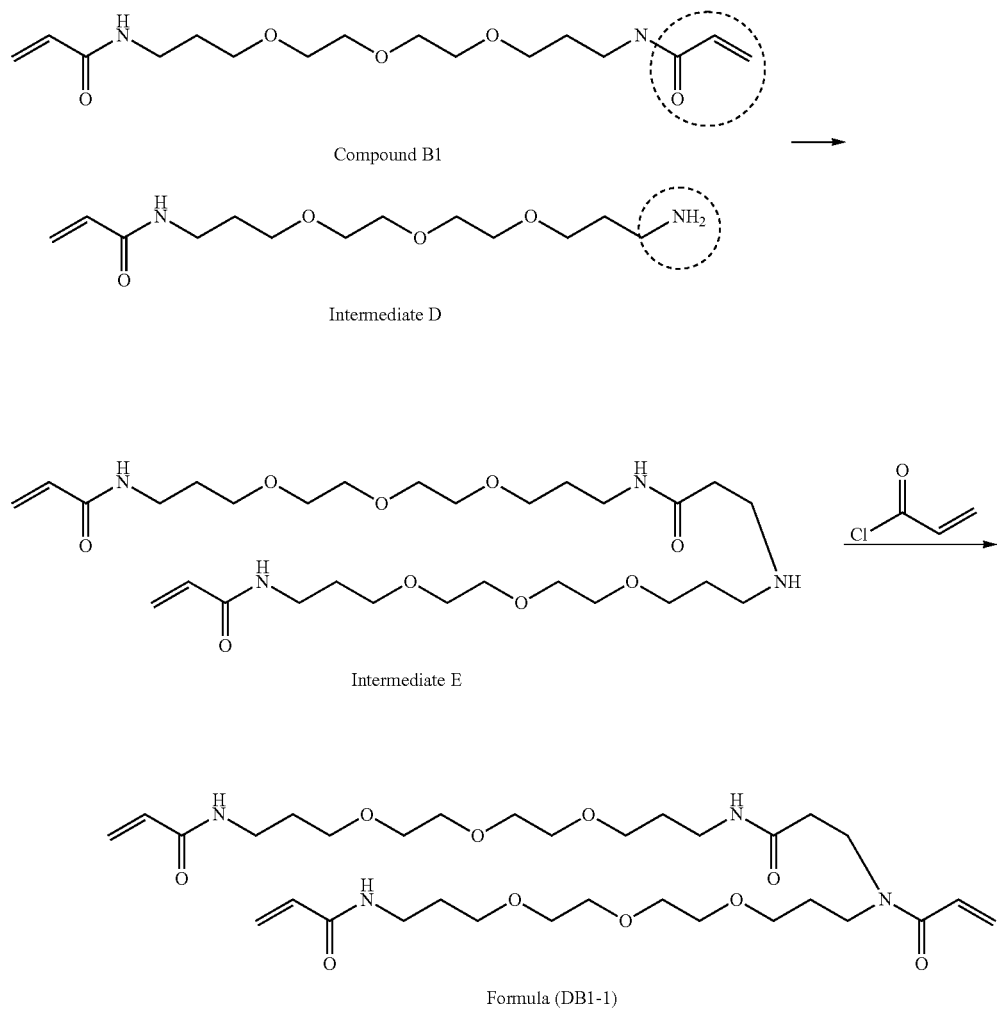

Further, according to the following scheme, the compound represented by Formula (DB1-1) may also be obtained through a Michael addition reaction of an α,β-unsaturated carbonyl group, which is surrounded by a broken line in one compound B1, and an NH group which is surrounded by a broken line in another compound B1.

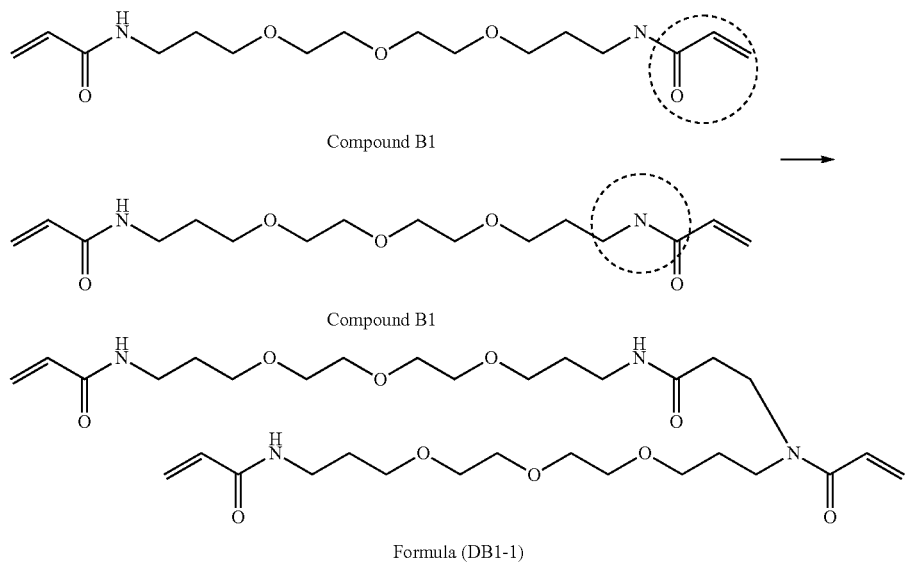

Formula (DB1-1)

Examples of the compound Y include a compound represented by Formula (DB1-1).

The compound Y can be synthesized using a well-known method. For example, in a case where an amine compound such as 4,7,10-trioxa-1,13-tridecanediamine is caused to react with acryloyl chloride or methacryloyl chloride for amidation, the reaction temperature is set to be 40° C. or higher to accelerate the Michael addition reaction as a side reaction. Next, the compound Y is collected from the obtained product using column chromatography.

<Curable Composition>

In a case where the curable composition is the curable composition according to the aspect 1 (the aspect including the compound A and the compound X), the content of the compound X is 0.01 to 2.0 mass % with respect to the total mass of the compound A and the compound X, and is preferably 0.1 to 1.0 mass % from the viewpoint of further improving the effects of the present invention. In a case where the content of the compound X is lower than 0.01 mass %, the solubility of the curable composition in a solvent (in particular, water) is poor. In a case where the content of the compound X is higher than 2.0 mass %, film properties of a cured product which is obtained from the curable composition stored for a predetermined period are poor.

As the compound X, one kind may be used alone, or a combination of two or more kinds may be used. That is, as the compound X, a combination of two or more compounds selected from the compounds represented by Formulae (X1) to (X4) may be used.

In addition, the content of the compound X refers to the total mass of compounds corresponding to the compound X and, in a case where plural kinds of compounds X are used, refers to the total content of the compounds X.

In the aspect 1, the content of the compound A is not particularly limited and, from the viewpoint of handleability, is preferably 98.0 to 99.99 mass % and more preferably 99.0 to 99.9 mass % with respect to the total mass of the curable composition.

As the compound A, one kind may be used alone, or a combination of two or more kinds may be used.

In a case where the curable composition is the curable composition according to the aspect 2 (the aspect including the compound B and the compound Y), the content of the compound Y is 0.01 to 2.0 mass % with respect to the total mass of the compound B and the compound Y, and is preferably 0.1 to 1.0 mass % from the viewpoint of further improving the effects of the present invention. In a case where the content of the compound Y is lower than 0.01 mass %, the solubility of the curable composition in a solvent (in particular, water) is poor. In a case where the content of the compound Y is higher than 2.0 mass %, film properties of a cured product which is obtained from the curable composition stored for a predetermined period are poor.

As the compound Y, one kind may be used alone, or a combination of two or more kinds may be used.

In addition, the content of the compound Y refers to the total mass of compounds corresponding to the compound Y and, in a case where plural kinds of compounds Y are used, refers to the total content of the compounds Y.

In the aspect 2, the content of the compound B is not particularly limited and, from the viewpoint of handleability, is preferably 98.0 to 99.99 mass % and more preferably 99.0 to 99.9 mass % with respect to the total mass of the curable composition.

As the compound B, one kind may be used alone, or a combination of two or more kinds may be used.

In a preferable aspect of the curable composition, for example, any one of the following requirements 1 to 5 is satisfied from the viewpoint of further improving the effects of the present invention.

Requirement 1: the curable composition includes the compound represented by Formula (A-1) as the compound A and includes at least one compound selected from the group consisting of compounds represented by Formulae (DA1-1) to (DA1-4) as the compound X.

Requirement 2: the curable composition includes the compound represented by Formula (A-2) as the compound A and includes at least one compound selected from the group consisting of compounds represented by Formulae (DA2-1) to (DA2-4) as the compound X.

Requirement 3: the curable composition includes the compound represented by Formula (A-3) as the compound A and includes at least one compound selected from the group consisting of compounds represented by Formulae (DA3-1) to (DA3-8) as the compound X.

Requirement 4: the curable composition includes the compound represented by Formula (A-4) as the compound A and includes at least one compound selected from the group consisting of compounds represented by Formulae (DA4-1) to (DA4-4) as the compound X.

Requirement 5: the curable composition includes the compound represented by Formula (B-1) as the compound B and includes a compound represented by Formula (DB1-1) as the compound Y.

<Other Optional Components>

In addition to the (meth)acrylamide compound (compound A, compound B) and the specific additive, the curable composition may further include other optional components. Hereinafter, the optional components will be described.

(Polymerization Initiator)

The curable composition may include a polymerization initiator. As the polymerization initiator, a well-known polymerization initiator can be used without any particular limitation. Examples of the polymerization initiator include a photopolymerization initiator and a thermal polymerization initiator. As the polymerization initiator, a so-called radical polymerization initiator is preferable.

Examples of the photopolymerization initiator include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound.

Examples of the thermal polymerization initiator include: an azo compound such as 2,2' -azobisisobutyronitrile (AIBN), 3-carboxypropionitrile, azobismalenonitrile, or dimethyl-(2,2')-azobis(2-methylpropionate) [V-601]; and an organic peroxide such as benzoyl peroxide, lauroyl peroxide, or potassium persulfate.

Specific examples of the polymerization initiator include polymerization initiators described in pp. 65 to 148 of "Ultraviolet Curing System" (Kiyomi KATO, United Engineering Center, 1989).

As the polymerization initiator, one kind may be used alone, or two or more kinds may be used in combination.

The content of the polymerization initiator in the curable composition according to the present invention is not particularly limited and, from the viewpoint of reactivity, is preferably 0.01 to 35 parts by mass, more preferably 0.1 to 30 parts by mass, and still more preferably 0.5 to 30 parts by mass with respect to 100 parts by mass of the (meth)acrylamide compound (the compound A or the compound B).

(Solvent)

The curable composition according to the present invention may include a solvent within a range where the effects of the present invention do not deteriorate.

As the solvent, water, an organic solvent, or a mixed solvent of two or more solvents thereof can be widely used.

Among these, water, an alcohol (for example, ethanol, methanol, or isopropanol), a ketone (for example, methyl ethyl ketone or acetone), an acetate (for example, methyl acetate, ethyl acetate, or butyl acetate), propylene glycol monomethyl ether, cyclohexanone, methyl isobutyl ketone, or a mixed solvent thereof is preferable.

The content of the solvent in the curable composition according to the present invention is not particularly limited and, from the viewpoint of handleability, is preferably 90 mass % or lower and more preferably 60 mass % or lower with respect to the total mass of the curable composition. The lower limit is preferably 10 mass % or higher and more preferably 20 mass % or higher.

In addition to the above-described components, the curable composition according to the present invention may include other components. Examples of the other components include various well-known additives such as a polymerizable compound other than the (meth)acrylamide compound, a chain transfer agent, a coloring material, a sensitizer, resin particles, a surfactant, an ultraviolet absorber, an antifading agent, a fungicide, a pH adjuster, a rust inhibitor, an antioxidant, an emulsion stabilizer, a preservative, an antifoaming agent, a viscosity adjuster, a dispersion stabilizer, a chelating agent, or a solid wetting agent.

<Method of Preparing Curable Composition>

A method of preparing the curable composition is not particularly limited, and a well-known method can be adopted. For example, the (meth)acrylamide compound (the compound A or the compound B) and the specific additive are synthesized separately, and the synthesized components are mixed with other optional components using a well-known method (for example, an ultrasonic method, a mixer method, a three-roll method, or a ball mill method) to obtain the curable composition.

In addition, by adjusting conditions of a method of synthesizing the (meth)acrylamide compound (the compound A or the compound B), not only the (meth)acrylamide compound (the compound A or the compound B) but also a predetermined amount of the specific additive obtained as a by-product may be synthesized. That is, the (meth)acrylamide compound (the compound A or the compound B) and the specific additive may be synthesized in a batch process.

A method of manufacturing a cured product using the curable composition is not particularly limited, and a well-known method can be adopted. For example, the curable composition is applied to a predetermined substrate to form a coating film, and the coating film is optionally dried and cured. As a result, a cured product can be obtained.

Hereinafter, regarding the procedure of the method, a coating film forming step of forming a coating film, a drying step of drying the coating film, and a curing step of curing the coating film will be described separately.

(Coating Film Forming Step)

In the step, the curable composition is applied to a predetermined substrate to form a coating film. In the step, the coating film to be cured as described below is formed.

The curable composition used in the step is as described above.

In addition, the kind of the substrate to be used is not particularly limited. A well-known substrate can be adopted, and an optimum substrate is appropriately selected according to the use of the curable composition. Examples of a material used for the substrate include a resin, paper, glass, a silicon semiconductor, a compound semiconductor, a metal oxide, a metal nitride, wood, and a composite material thereof.

A method of applying the curable composition to the substrate is not particularly limited, and a well-known method can be adopted. Examples include a coating method such as a screen printing method, a dip coating method, a spray coating method, a spin coating method, and an ink jet method.

A shape of the coating film is not particularly limited and may be a shape covering the entire surface of the substrate or a pattern shape (for example, a wiring shape or a dot shape).

The amount of the curable composition applied to the substrate may be appropriately adjusted according to the desired thickness of the cured product. Typically, the thickness of the coating film is preferably 0.01 to 1000 μm.

(Drying Step)

In the step, the formed coating film is dried to remove a volatile component (for example, the solvent). The step can be optionally performed before the curing step described below after the coating film forming step.

The drying can be performed by well-known heating means such as a heater, blowing means using air such as a dryer, or a combination thereof. Examples of the heating method include: a method applying heat using a heater or the like to a surface of the substrate opposite to a surface to which the curable composition is applied; a method of blowing warm air or hot air to the surface of the substrate to which the curable composition is applied; and a heating method using an infrared heater. The heating may be performed using a combination of a plurality of methods.

The drying may be performed in a non-oxidizing atmosphere or an oxidizing atmosphere. Examples of the non-oxidizing atmosphere include an inert gas atmosphere such as nitrogen or argon and a reducing gas atmosphere such as hydrogen. Examples of the oxidizing atmosphere include an air atmosphere and an oxygen atmosphere.

(Curing Step)

In the curing step, the coating film disposed on the substrate is cured to obtain a cured product. A curing method is not particularly limited, and examples thereof include heating and active energy ray irradiation.

The heating means of the heating is not particularly limited, and well-known heating means such as an oven or a hot plate can be used.

Regarding conditions of the heating, the heating temperature is preferably 50° C. to 200° C. and more preferably 100° C. to 150° C. from the viewpoint that the cured product can be formed within a short time.

As the active energy ray, for example, an α-ray, a γ-ray, an electron beam, an X-ray, ultraviolet light, visible light, or infrared light can be used. From the viewpoints of safety and the like, ultraviolet light, visible light, or infrared light is preferable, and ultraviolet light is more preferable as the active energy ray. For example, the wavelength of the active energy ray is preferably 200 to 600 nm, more preferably 250 to 450 nm, and still more preferably 250 to 400 nm.

The output of the active energy ray is preferably 5000 mJ/cm$^2$ or lower, more preferably 10 to 4000 mJ/cm$^2$, and still more preferably 20 to 3000 mJ/cm$^2$.

Examples of a device that can irradiate the active energy ray include a mercury lamp such as a light emitting diode (LED) lamp, a high pressure mercury lamp, an extra high pressure mercury lamp, a deep ultraviolet (DeepUV) lamp, or a low-pressure ultraviolet (UV) lamp, a halide lamp, a xenon flash lamp, a metal halide lamp, an excimer lamp such as an ArF excimer lamp or a KrF excimer lamp, an extreme ultraviolet lamp, and an exposure device using an electron beam or an X-ray lamp as a light source. Ultraviolet irradiation can be performed using a typical ultraviolet irradiation device, for example, a commercially available ultraviolet irradiation device (for example, SP9-250UB, manufactured by Ushio Inc.) for curing/adhesion/exposure.

The curing may be performed in a non-oxidizing atmosphere or an oxidizing atmosphere. Examples of the non-oxidizing atmosphere include an inert gas atmosphere such as nitrogen or argon and a reducing gas atmosphere such as hydrogen. Examples of the oxidizing atmosphere include an air atmosphere and an oxygen atmosphere.

Through the above-described procedure, the cured product can be for ed on the substrate.

In a case where the coating film is formed on the substrate in a pattern shape, the obtained cured product is also formed in a pattern shape.

In addition, during the curing, the pattern-shaped cured product may be manufactured by curing the coating film in a pattern shape and removing a non-cured portion by development or the like.

<Use of Curable Composition>

The curable composition according to the present invention can be used for various uses.

For example, the curable composition according to the present invention is applicable to, for example, a paint, an adhesive, a pressure sensitive adhesive, an ink, a coating, a functional film, a film, an optical material, a printing plate material, a semiconductor material, a recording material, a paper additive, a medical material, a plastic, a functional gel, or a cosmetic material.

Other examples of the use of the curable composition according to the present invention will be described below, but the use of the curable composition according to the present invention is not limited thereto. Hereinafter, regarding the use to which the curable composition according to the present invention is applicable, uses described in well-known publications will be described. A compound described in each well-known publication may be added to the curable composition according to the present invention such that the obtained mixture is suitably applicable to the use.

More specifically, examples of an aspect where the curable composition is used as a paint include: a self-repairing paint described in JP2013-049839A or JP2011-005766A; a wood paint described in JP2006-007202A or JP5072140B; an antibacterial paint described in JP2011-057855A; a paint for suppressing water flow resistance described in JP1999-019578A (JP-H11-019578A); and a conductive paint described in JP5014750B.

More specifically, examples of an aspect where the curable composition is used as an adhesive include: a dental adhesive described in JP2010-235458A, JP4664591B, JP2013-056839A, or JP4171600B; a medical adhesive described in JP2011-026551A or JP2009-247437A; an adhesive for a recording material described in JP2011-198434A or JP2011-165238A; and an adhesive for an optical member described in JP5491525B or JP2012-46658A.

More specifically, examples of an aspect where the curable composition is used as a pressure sensitive adhesive include: a pressure sensitive adhesive for a hard coat film described in JP2013-032500A or JP2013-040256A; a radiation-curable pressure sensitive adhesive for an optical member described in WO10/092988A; and a pressure sensitive adhesive for a dicing tape described in JP5089710B or JP2011-089073A.

More specifically, examples of an aspect where the curable composition is used as an ink include: an ink jet ink described in JP2002-241654A or JP2010-106085A; a printing ink described in JP1998-17605A (JP-H10-17605A) or JP2002-285062A; and an over print varnish described in W1998-195371 A (JP-H10-195371A).

More specifically, examples of an aspect where the curable composition is used as a coating include: a coating agent for an optical fiber described in JP2012-136426A or JP2006-208663A; a buffer coating agent described in JP2011-116968A; a glazing described in JP2012-229331A or JP2011-074135A; a coating for a headlight described in JP2011-241356A or JP2002-212507A; a coating for a building material described in JP2011-088995A or JP2011-213002A; a hard coating agent for a cosmetic container described in JP2008-303310A or JP2006-1984A; a coating agent for an electronic apparatus described in JP2011-225846A; a silver transparent conductive film overcoating agent described in JP2013-65305A or JP2013-22843A; a seating material for an electronic apparatus described in JP2012-000828A or JP2010-278157A; a coating agent for kitchen appliances JP2011-094125A or JP2004-211025A; a hybrid hard coating agent described in JP2005-336255A or JP1999-194491A (JP-H11-194491A); an antifouling coating described in JP2012-219116A or JP2010-095707A; a high weather-fastness coating material described in JP2013-035267A or JP2012-167288A; an antistatic agent described in JP4600606B or JP2010-229187A; and a coating agent for a medical member described in JP2011-072341A.

Examples of an aspect where the curable composition is used for forming a functional film include formation of various functional films including: an ion-exchange membrane described in JP5579365B; a reverse osmosis membrane described in JP4070009B or JP2014-069155A; a proton-conducting membrane described in JP5346194B or JP4014422B; and a porous membrane described in JP5014576B.

Examples of an aspect where the curable composition is used for forming a film include formation of various films including: a heat barrier film described in JP2012-128231A or JP1998-100310A (JP-H10-100310A); a hard coat film described in JP2013-075955A, JP2012-197383A, JP2013-064821A, or JP2013-050641A; an antireflection film described in JP2013-083795A or JP2013-033098A; a diffusion film described in JP2012-098526A or JP2012-078799A; a peeling film described in JP2012-250353A or JP2011-178002A; a solar cell back sheet described in JP2012-227382A or JP2012-218209A; an electromagnetic wave shield described in JP2011-124536A or JP2010-147431A; a gas barrier film described in JP5116410B; a film for wrapping food or medical products described in JP2008-150610A; and arm optical film described in JP2008-165205A or JP2012-150428A.

Examples of an aspect where the curable composition is used for an optical material include formation of an optical lens described in JP2006-233172A.

Examples of an aspect where the curable composition is used as a printing plate material include: an image forming material described in JP1998-221850A (JP-H10-221850A); and a resin composition for laser engraving described in JP2009-226946A.

Examples of an aspect where the curable composition is used as a semiconductor material include: a dry film resist described in JP2009-048170A; a resist lower layer film described in JP2013-083947A or JP2012-203393A; a nano imprinting material described in JP2013-062489A or JP2012-214022A; a solder resist material described in JP2009-217040A; and a color resist material described in JP2012-027448A, JP2010-204363A, JP2013-053224A, or JP2011-095732A.

Examples of an aspect where the curable composition is used as a recording material include a hard coating agent for a recording medium described in JP2011-192342A, JP2011-126991A, or JP1994-128501A (JP-H6-128501A).

More specifically, examples of an aspect where the curable composition is used as a paper additive include: a paper making additive described in JP5618090B or JP4158145B; and a recording paper coating agent described in JP1999-115305A (JP-H11-115305A) or JP3647125B.

Examples of an aspect where the curable composition is used as a medical material include: a pharmaceutical described in JP2012-011269A; an artificial bone described in JP2008-535979A or JP5502768B; a contact lens described in JP4988025B or JP2679773B; and a wrapping curable composition described in JP2000-346770A.

Examples of an aspect where the curable composition is used as a plastic include: a three-dimensional shaping composition described in JP2010-155889A or JP2012-111226A.

Examples of an aspect where the curable composition is used as a functional gel include: an electrolytic gel described in JP2008-285668A, JP2004-342537A, or JP5103721B; a water-absorbing gel described in JP2008-538375A or JP1997-077832A (JP-H9-077832A); an ionic gel described in JP2001-000406A or JP1997-140681A (JP-H19-140681A); and a medical gel described in JP2011-197196A or WO03/083475A.

Examples of an aspect where the curable composition is used as a cosmetic material include: a cosmetic gel described in JP2013-053090A, or JP2011-241172A.

More specific examples of the use of the curable composition according to the present invention will be described below in detail.

In a case where the curable composition according to the present invention is used as a pressure sensitive adhesive, a preferable radiation-curable pressure sensitive adhesive composition for an optical member can be obtained, for example, by using the curable composition according to the present invention in combination with a polyfunctional acrylate described in WO10/092995A or WO10/092988A.

In addition, in a case where the curable composition according to the present invention is used as an optical film, a preferable optical film can be manufactured, for example, by using the curable composition according to the present invention in combination with a polyfunctional acrylate described in JP2008-165205A or JP2012-150428A.

In addition, in a case where the curable composition according to the present invention is used as a printing plate material, a preferable resin printing plate precursor for laser engraving can be manufactured, for example, by using the curable composition according to the present invention in combination with a polyfunctional acrylate described in JP2009-226946A.

In addition, in a case where the curable composition according to the present invention is used as a solder resist material, each photosensitive film is manufactured, for example, by using the curable composition according to the present invention in combination with a polyfunctional acrylate described in JP2009-217040A such that the photosensitive film can be laminated on a copper clad laminate.

In addition, in a case where the curable composition according to the present invention is used as an antifouling coating, a coating agent for glasses can be manufactured, for example, by using the curable composition according to the present invention in combination with a polyfunctional acrylate described in JP2012-219116A.

In addition, the curable composition according to the present invention can be used for manufacturing a metal material. For example, a surface metal film material can be manufactured by manufacturing a cured film described in JP2009-263707A using the curable composition according to the present invention.

In addition, in a case where the curable composition according to the present invention is used as a lens, each lens can be manufactured, for example, by using the curable composition according to the present invention in combination with a polyfunctional acrylate described in JP2011-072341A.

In addition, the curable composition according to the present invention is also useful as a medical material (for example, an eye lens, an endoscope, a catheter, a transfusion tube, a gas transport tube, a stent, a sheath, a cuff, a tube connector, an access port, a drainage bag, a blood circuit, a wound dressing, or a drug carrier) described in JP2011-072341A.

In the curable composition according to the present invention, non-cured (meth)acrylamide compounds are likely to be stacked due to a hydrogen bond derived from amido groups in the (meth)acrylamide compounds. As a result, an effect of reducing curing shrinkage and an effect of improving adhesiveness with the substrate due to the hydrogen bond of the amido groups can be obtained. In addition, oxygen polymerization inhibition caused by a (meth)acrylamide group can be reduced, and thus the reactivity can be improved. The curable composition according to the present invention can be preferably used particularly for the above-described purposes.

EXAMPLES

Hereinafter, the present invention will be described in more detail using examples, but the present invention is not limited to these examples. Unless specified otherwise, "part(s)" and "%" represent "part(s) by mass" and "mass %".

Synthesis Example 1

Synthesis of Compound B1

40.0 g (182 mmol) of 4,7,10-trioxa-1,13-tridecanediamine, 37.8 g (450 mmol) of sodium bicarbonate, 100 g of water, and 300 mL of tetrahydrofuran were added to a 1 L three-neck flask including a stirrer to prepare a mixed solution. Next, 35.2 g (389 mmol) of acryloyl chloride was added dropwise to the mixed solution in an ice bath for 20 minutes. After the dropwise addition, the obtained reaction mixture was stirred at room temperature for 5 hours, and then tetrahydrofuran was removed by distillation from the reaction mixture under reduced pressure. Next, the remaining water phase was extracted with 200 ml of ethyl acetate four times, and the obtained organic phase was dried with magnesium sulfate and was tittered to remove the solvent by distillation under reduced pressure. The obtained reaction mixture was purified by column chromatography (eluent: methanol/ethyl acetate=10/90), and the solvent was removed by distillation. As a result, 23.7 g (72,5 mmol; yield: 40%) of a white solid of a desired compound B1 was obtained.

Synthesis Example 2

Synthesis of Compound A1

A compound A1 was synthesized through the same procedure as that of Synthesis Example 1, except that 45.8 g of diethylenetriamine was used instead of 4,7,10-trioxa-1,13-tridecanediamine.

Synthesis Example 3

Synthesis of Compound A2

A compound A2 was synthesized through the same procedure as that of Synthesis Example 1, except that 48.7 g of triethylenetetramine was used instead of 4,7,10-trioxa-1,13-tridecanediamine.

Synthesis Example 4

Synthesis of Compound A3

A compound A3 was synthesized through the same procedure as that of Synthesis Example 1, except that 46.9 g of 1,4,8-triazaoctane was used instead of 4,7,10-trioxa-1,13-tridecanediamine.

Synthesis Example 5

Synthesis of Compound A4

A compound A4 was synthesized through the same procedure as that of Synthesis Example 1, except that 52.48 g of 3,3'-diaminopropylamine was used instead of 4,7,10-trioxa-1,13-tridecanediamine.

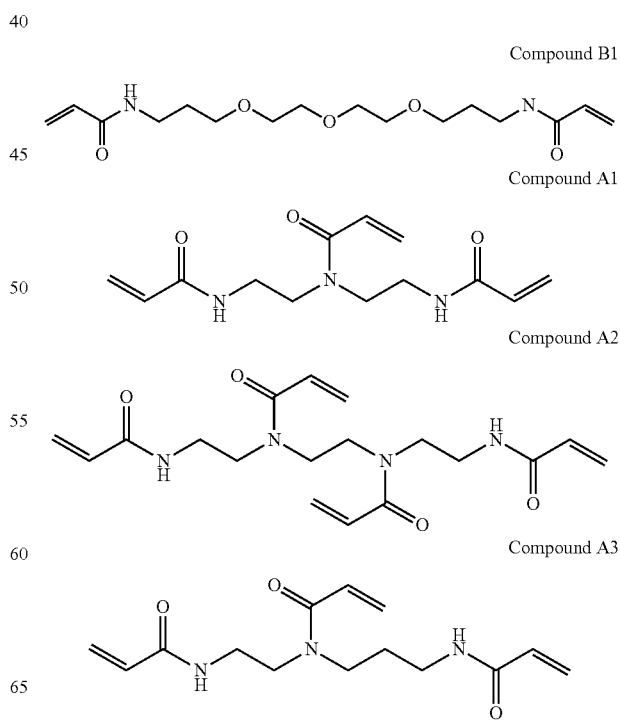

Compound A4

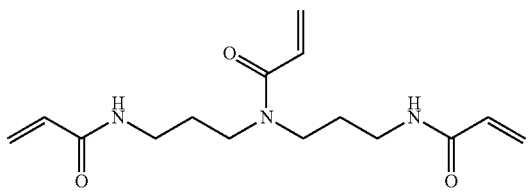

Synthesis Example 6

Synthesis of Compound B1-2

40.0 g (182 mmol) of 4,7,10-trioxa-1,13-tridecanediamine, 37.8 g (450 mmol) of sodium bicarbonate, 100 g of water, and 300 mL of tetrahydrofuran were added to a 1 L three-neck flask including a stirrer to prepare a mixed solution. Next, 35.2 g (389 mmol) of acryloyl chloride was added dropwise to the mixed solution at a reaction temperature of 40° C. for 60 minutes. After the dropwise addition, the obtained reaction mixed solution was stirred at room temperature for 5 hours, and then tetrahydrofuran was removed by distillation from the reaction mixture under reduced pressure. Next, the remaining water phase was extracted with 200 ml of ethyl acetate four times, and the obtained organic phase was dried with magnesium sulfate and was filtered to remove the solvent by distillation under reduced pressure. The obtained reaction mixture was purified by column chromatography (eluent: methanol/ethyl acetate=10/90), and the solvent was removed by distillation. As a result, 17.9 g (27.3 mmol; yield: 15%) of a desired compound B1-2 was obtained.

The compound B1-2 was the compound represented by Formula (DB1-1).

Synthesis Example 7

Synthesis of Mixture A1

A mixture A1 was synthesized through the same procedure as that of Synthesis Example 6, except that 45.8 g of diethylenetriamine was used instead of 4,7,10-trioxa-1,13-tridecanediamine.

The mixture A1 was a mixture of the compound represented by Formula (DA1-1), the compound represented by Formula (DA1-2), the compound represented by Formula (DA1-3), and the compound represented by Formula (DA1-4).

Synthesis Example 8

Synthesis of Mixture A2

A mixture A2 was synthesized through the same procedure as that of Synthesis Example 6, except that 48.7 g of triethylenetetramine was used instead of 4,7,10-trioxa-1,13-tridecanediamine.

The mixture A2 was a mixture of the compound represented by Formula (DA2-1), the compound represented by Formula (DA2-2), the compound represented by Formula (DA2-3), and the compound represented by Formula (DA2-4).

Synthesis Example 9

Synthesis of Mixture A3

A mixture A3 was synthesized through the same procedure as that of Synthesis Example 6, except that 46.9 g of 1,4,8-triazaoctane was used instead of 4,7,10-trioxa-1,13-tridecanediamine.

The mixture A3 was a mixture of the compound represented by Formula (DA3-1), the compound represented by Formula (DA3-2), the compound represented by Formula (DA3-3), the compound represented by Formula (DA3-4), the compound represented by Formula (DA3-5), the compound represented by Formula (DA3-6), the compound represented by Formula (DA3-7), and the compound represented by Formula (DA3-8).

Synthesis Example 10

Synthesis of Mixture A4

A mixture A4 was synthesized through the same procedure as that of Synthesis Example 6, except that 52.48 g of 3,3'-diaminopropylamine was used instead of 4,7,10-trioxa-1,13-tridecanediamine.

The mixture A4 was a mixture of the compound represented by Formula (DA4-1), the compound represented by Formula (DA4-2), the compound represented by Formula (DA4-3), and the compound represented by Formula (DA4-4).

(Manufacturing of Curable Composition)

A methanol solution in which the mixture A1 was dissolved was mixed with the separately synthesized compound A1 to obtain a clayey material impregnated with the solvent. The obtained clayey material was stretched in a Teflon vat, and the solvent was dried and removed by blast drying. As a result, a curable composition in which the compound A1 and the mixture A1 were mixed with each other at a mass ratio shown in Table 1 below was obtained. The curable composition did not substantially include the solvent, and the content of the compound A1 was 99 mass % or higher with respect to the total mass of the curable composition.

In other Examples and Comparative Examples, curable compositions were manufactured by adjusting the mass ratio between the (meth)acrylamide compound (the compound A or the compound B) and the specific additive to be as shown in Table 1.

<Evaluation>

(Evaluation of Properties of Cured Film)

Using a coating solution which was prepared using the curable composition stored for a predetermined period, a cured film was obtained, and properties of the obtained cured film were evaluated.

Specifically, first, the curable composition manufactured in each of Examples and Comparative Examples was stored at 50° C. for one month.

Next, 10 g of the curable composition stored for the predetermined time, 1 g of VA-61 (polymerization initiator; manufactured by Wako Pure Chemical Industries, Ltd.), and 40 g of water were stirred in a brown bottle for 10 minutes to prepare a coating solution.

Next, the coating solution was applied using a bar coater to a polyethylene terephthalate (PET) film having undergone an ozone treatment such that the thickness of the coating film was 1 to 2 μm.

Next, the PET film including the coating film was put into an oven dryer at 80° C., was left to stand for one hour, and was dried and thermally cured to obtain a cured film.

Whether or not haze and formation of solid matter occurred in the obtained cured film was determined by visual inspection, and the obtained cured film was evaluated based on the following standards.

"AA": a case where haze and solid matter were not observed at all

"A": unidentified unevenness was observed regarding haze and formation of solid matter, but there were no problems in practice "B": haze and/or solid matter was slightly observed, but there were no problems in practice "C": haze and/or solid matter was clearly observed, and there were problems in practice (Evaluation of Solubility)

Water was added to the curable composition manufactured in each of Examples and Comparative Examples, and the content of water was adjusted to be 90 mass % with respect to the total mass of the composition. The obtained composition was stirred, and the solubility of solid matter was determined by visual inspection after 10 minutes, 1 hours, and 3 hours from the start of the stirring.

"AA": the solid matter was dissolved within 10 minutes, and a uniform solution was obtained "A": the solid matter was dissolved within a period of longer than 10 minutes and 1 hour or shorter, and a uniform solution was obtained "B": the solid matter was dissolved within a period of longer than 1 hour and 3 hours or shorter, and a uniform solution was obtained "C": the solid matter was not dissolved even after 3 hours.

Table 1 collectively shows the results. In Table 1 below, "Mass Ratio" refers to mass % of the (meth)acrylamide compound and mass % of the specific additive with respect to the total mass of the (meth)acrylamide compound and the specific additive.

TABLE 1

| (First) | Kind of (Meth)Acrylamide Compound | Kind of Specific Additive | Mass Ratio | | Evaluation | |
|---|---|---|---|---|---|---|
| | | | Mass % of (Meth)Acrylamide Compound | Mass % of Special Additive | Evaluation of Properties of Cured Film | Evaluation of Solubility |
| Example 1 | Compound B1 | Compound B1-2 | 99.99 | 0.01 | AA | A |
| Example 2 | Compound B1 | Compound B1-2 | 99.95 | 0.05 | AA | A |
| Example 3 | Compound B1 | Compound B1-2 | 99.9 | 0.1 | AA | AA |
| Example 4 | Compound B1 | Compound B1-2 | 99.8 | 0.2 | AA | AA |
| Example 5 | Compound B1 | Compound B1-2 | 99.5 | 0.5 | AA | AA |
| Example 6 | Compound B1 | Compound B1-2 | 99.2 | 0.8 | AA | AA |
| Example 7 | Compound B1 | Compound B1-2 | 99 | 1 | AA | AA |
| Example 8 | Compound B1 | Compound B1-2 | 98.5 | 1.5 | A | AA |
| Example 9 | Compound B1 | Compound B1-2 | 98 | 2 | A | AA |
| Example 10 | Compound A1 | Mixture A1 | 99.99 | 0.01 | AA | A |
| Example 11 | Compound A1 | Mixture A1 | 99.95 | 0.05 | AA | A |
| Example 12 | Compound A1 | Mixture A1 | 99.9 | 0.1 | AA | AA |
| Example 13 | Compound A1 | Mixture A1 | 99.8 | 0.2 | AA | AA |
| Example 14 | Compound A1 | Mixture A1 | 99.5 | 0.5 | AA | AA |
| Example 15 | Compound A1 | Mixture A1 | 99.2 | 0.8 | AA | AA |
| Example 16 | Compound A1 | Mixture A1 | 99 | 1 | AA | AA |
| Example 17 | Compound A1 | Mixture A1 | 98.5 | 1.5 | A | AA |
| Example 18 | Compound A1 | Mixture A1 | 98 | 2 | A | AA |
| Example 19 | Compound A2 | Mixture A2 | 99.99 | 0.01 | AA | A |
| Example 20 | Compound A2 | Mixture A2 | 99.95 | 0.05 | AA | A |
| Example 21 | Compound A2 | Mixture A2 | 99.9 | 0.1 | AA | AA |
| Example 22 | Compound A2 | Mixture A2 | 99.8 | 0.2 | AA | AA |
| Example 23 | Compound A2 | Mixture A2 | 99.5 | 0.5 | AA | AA |
| Example 24 | Compound A2 | Mixture A2 | 99.2 | 0.8 | AA | AA |
| Example 25 | Compound A2 | Mixture A2 | 99 | 1 | AA | AA |
| Example 26 | Compound A2 | Mixture A2 | 98.5 | 1.5 | A | AA |
| Example 27 | Compound A2 | Mixture A2 | 98 | 2 | A | AA |
| Example 28 | Compound A3 | Mixture A3 | 99.99 | 0.01 | AA | A |
| Example 29 | Compound A3 | Mixture A3 | 99.95 | 0.05 | AA | A |
| Example 30 | Compound A3 | Mixture A3 | 99.9 | 0.1 | AA | AA |
| Example 31 | Compound A3 | Mixture A3 | 99.8 | 0.2 | AA | AA |
| Example 32 | Compound A3 | Mixture A3 | 99.5 | 0.5 | AA | AA |
| Example 33 | Compound A3 | Mixture A3 | 99.2 | 0.8 | AA | AA |
| Example 34 | Compound A3 | Mixture A3 | 99 | 1 | AA | AA |
| Example 35 | Compound A3 | Mixture A3 | 98.5 | 1.5 | A | AA |
| Example 36 | Compound A3 | Mixture A3 | 98 | 2 | A | AA |
| Example 37 | Compound A4 | Mixture A4 | 99.99 | 0.01 | AA | A |
| Example 38 | Compound A4 | Mixture A4 | 99.95 | 0.05 | AA | A |
| Example 39 | Compound A4 | Mixture A4 | 99.9 | 0.1 | AA | AA |
| Example 40 | Compound A4 | Mixture A4 | 99.8 | 0.2 | AA | AA |
| Example 41 | Compound A4 | Mixture A4 | 99.5 | 0.5 | AA | AA |
| Example 42 | Compound A4 | Mixture A4 | 99.2 | 0.8 | AA | AA |
| Example 43 | Compound A4 | Mixture A4 | 99 | 1 | AA | AA |
| Example 44 | Compound A4 | Mixture A4 | 98.5 | 1.5 | A | AA |
| Example 45 | Compound A4 | Mixture A4 | 98 | 2 | A | AA |

TABLE 2

| Table 1 (Second) | Kind of (Meth)Acrylamide Compound | Kind of Specific Additive | Mass Ratio | | Evaluation | |
|---|---|---|---|---|---|---|
| | | | Mass % of (Meth)Acrylamide Compound | Mass % of Special Additive | Evaluation of Properties of Cured Film | Evaluation of Solubility |
| Comparative Example 1 | Compound B1 | — | 100 | 0 | AA | C |
| Comparative Example 2 | Compound B1 | Compound B1-2 | 99.995 | 0.005 | AA | C |
| Comparative Example 3 | Compound B1 | Compound B1-2 | 97.3 | 2.7 | C | AA |
| Comparative Example 4 | Compound A1 | — | 100 | 0 | AA | C |
| Comparative Example 5 | Compound A1 | Mixture A1 | 99.997 | 0.003 | AA | C |
| Comparative Example 6 | Compound A1 | Mixture A1 | 97.5 | 2.5 | C | AA |
| Comparative Example 7 | Compound A2 | — | 100 | 0 | AA | C |
| Comparative Example 8 | Compound A2 | Mixture A2 | 99.992 | 0.008 | AA | C |
| Comparative Example 9 | Compound A2 | Mixture A2 | 97 | 3 | C | AA |
| Comparative Example 10 | Compound A3 | — | 100 | 0 | AA | C |
| Comparative Example 11 | Compound A3 | Mixture A3 | 99.995 | 0.005 | AA | C |
| Comparative Example 12 | Compound A3 | Mixture A3 | 97.3 | 2.7 | C | AA |
| Comparative Example 13 | Compound A4 | — | 100 | 0 | AA | C |
| Comparative Example 14 | Compound A4 | Mixture A4 | 99.995 | 0.005 | AA | C |
| Comparative Example 15 | Compound A4 | Mixture A4 | 97.3 | 2.7 | C | AA |

As clearly seen from the results of Table 1, the curable composition according to the present invention has high solubility, and the properties of the cured film obtained from the curable composition were also superior. In particular, it was found that, in a case where the content of the specific additive was 0.1 to 1.0 mass %, the effects were higher.

On the other hand, in Comparative Examples in which the content of the specific additive was out of the predetermined range, the desired effects were not obtained.

The present inventors found that, in a case where each (meth)acrylamide compound (the compound A1, the compound B1, the compound A2, the compound A3, or the compound A4) is synthesized as described above using the synthesis method specifically disclosed in JP5591858B and JP5591857B in which purification is performed by column chromatography, the (meth)acrylamide compound does not include the specific additive as in Comparative Examples 1, 4, 7, 10, and 13. That is, it was clearly found from Comparative Examples 1, 4, 7, 10, and 13 that, even in a case where the (meth)acrylamide compound obtained using the synthesis method specifically disclosed in JP5591858B and JP5591857B is used, the desired effects cannot be obtained.

In addition, the present inventors found that, in a case where the (meth)acrylamide compounds (the compound A1, the compound B1, the compound A2, the compound A3, or the compound A4) is synthesized as described above using the synthesis method specifically disclosed in JP5611858B, the mixture including a large amount of the specific additive and the (meth)acrylamide compound is obtained as in Comparative Examples 3, 6, 9, 12, and 15. That is, it was clearly found from Comparative Examples 3, 6, 9, 12, and 15 that, even in a case where the (meth)acrylamide compound obtained using the synthesis method specifically disclosed in JP5611858B is used, the desired effects cannot be obtained.

What is claimed is:

1. A curable composition comprising:
a compound A represented by Formula (A) and at least one compound X selected from the group consisting of compounds represented by Formulae (X1) to (X4), in which a content of the compound X is 0.01 to 2.0 mass % with respect to a total mass of the compound A and the compound X; or
a compound B represented by Formula (B) and a compound Y represented by Formula (Y), in which a content of the compound Y is 0.01 to 2.0 mass % with respect to a total mass of the compound B and the compound Y, Formula (X1)

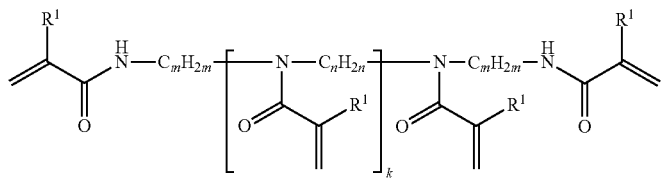

-continued

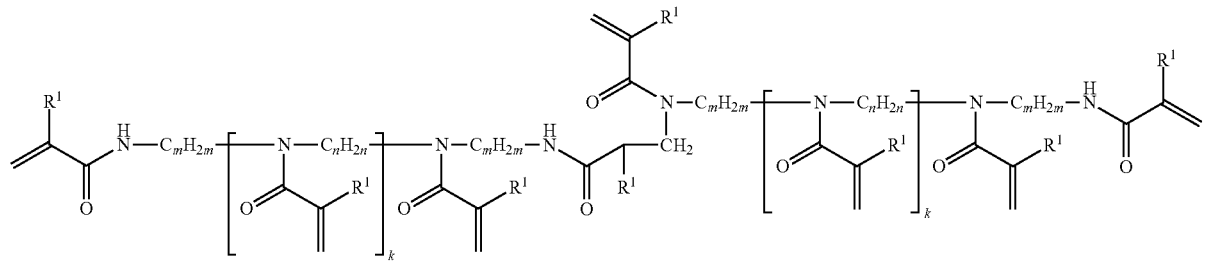

Formula (X1)

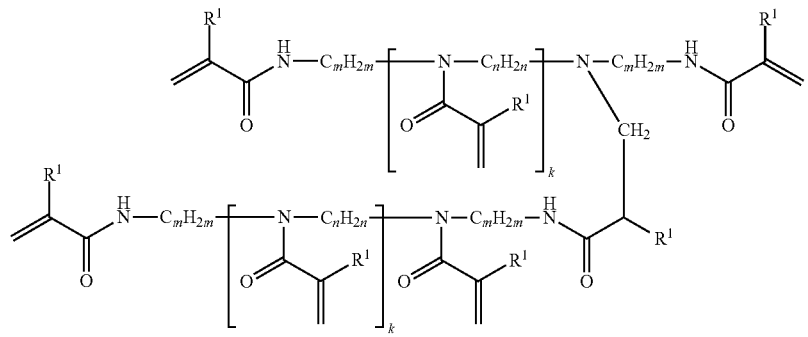

Formula (X2)

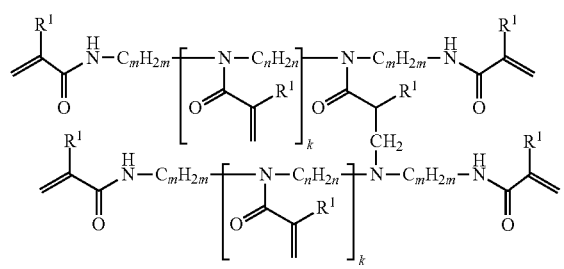

Formula (X3)

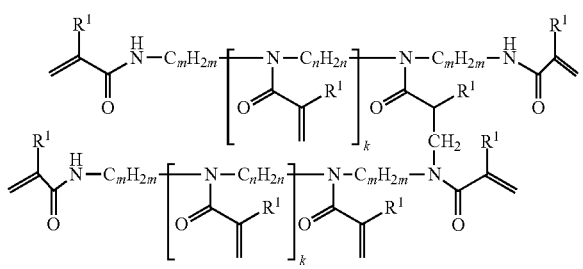

Formula (X4)

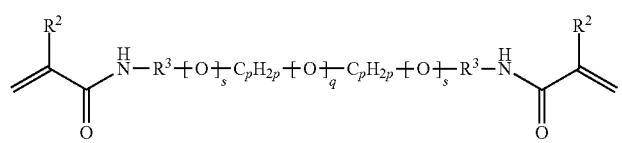

Formula (B)

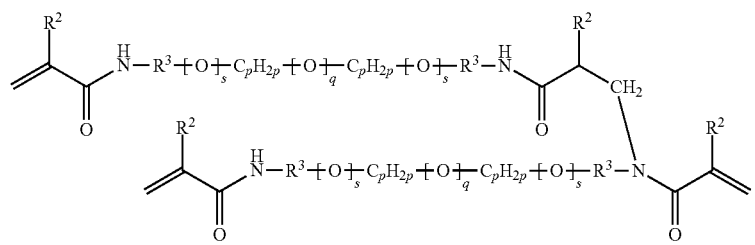

Formula (Y)

wherein in Formula (A) and Formulae (X1) to (X4), $R^1$ represents a hydrogen atom or a methyl group, m represents an integer of 2 to 4, n represents an integer of 2 to 4, k represents 0 or 1, and a plurality of $R^1$'s and a plurality of m's may be the same as or different from each other, and in Formula (B) and Formula (Y), $R^2$ represents a hydrogen atom or a methyl group, $R^3$ represents —CH$_2$CH(R$^2$)CH$_2$— or —CH$_2$CH$_2$—, s represents 1, q represents 0 or 1, p represents an integer of 2 to 6, and a plurality of $R^2$'s, a plurality of $R^3$'s, and a plurality of p's may be the same as or different from each other.

2. The curable composition according to claim 1, wherein the content of the compound X is 0.1 to 1.0 mass %, and the content of the compound Y is 0.1 to 1.0 mass %.

3. The curable composition according to claim 1, wherein the compound A represented by Formula (A) includes at least one compound selected from the group consisting of compounds represented by Formulae (A-1) to (A-4), and the compound B represented by Formula (B) includes a compound represented by Formula (B-1), Formula (A-1)

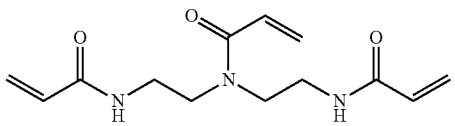

Formula (A-2)

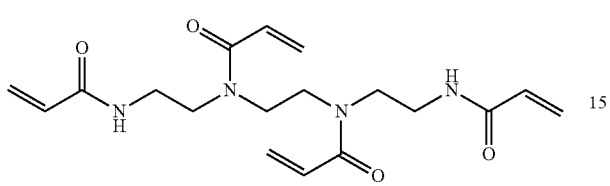

Formula (A-3)

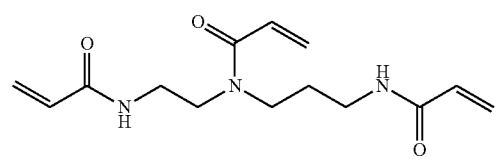

Formula (A-4)

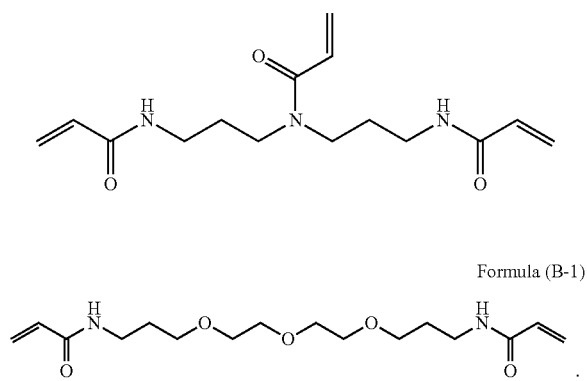

Formula (B-1)

Formula (A-2)

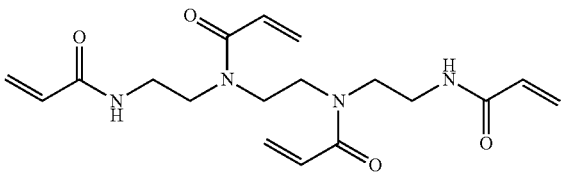

Formula (A-3)

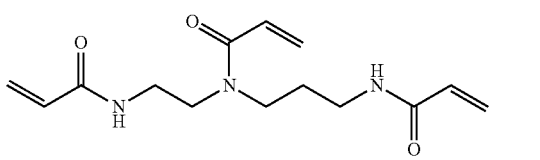

Formula (A-4)

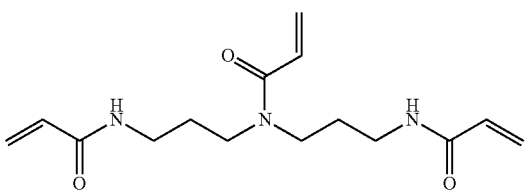

Formula (B-1)

4. The curable composition according to claim 2, wherein the compound A represented by Formula (A) includes at least one compound selected from the group consisting of compounds represented by Formulae (A-1) to (A-4), and the compound B represented by Formula (B) includes a compound represented by Formula (B-1), Formula (A-1)

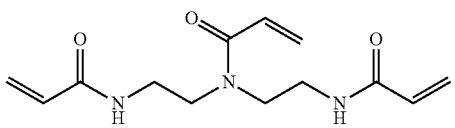

5. The curable composition according to claim 3, wherein any one of the following requirements 1 to 5 is satisfied, requirement 1: the curable composition includes the compound represented by Formula (A-1) as the compound A and includes at least one compound selected from the group consisting of compounds represented by Formulae (DA1-1) to (DA1-4) as the compound X, requirement 2: the curable composition includes the compound represented by Formula (A-2) as the compound A and includes at least one compound selected from the group consisting of compounds represented by Formulae (DA2-1) to (DA2-4) as the compound X, requirement 3: the curable composition includes the compound represented by Formula (A-3) as the compound A and includes at least one compound selected from the group consisting of compounds represented by Formulae (DA3-1) to (DA3-8) as the compound X, requirement 4: the curable composition includes the compound represented by Formula (A-4) as the compound A and includes at least one compound selected from the group consisting of compounds represented by Formulae (DA4-1) to (DA4-4) as the compound X, and requirement 5: the curable composition includes the compound represented by Formula (B-1) as the compound B and includes a compound represented by Formula (DB1-1) as the compound Y, Formula (DA1-1)
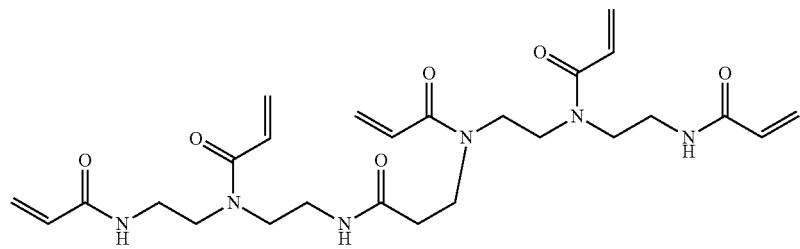
Formula (DA1-2)
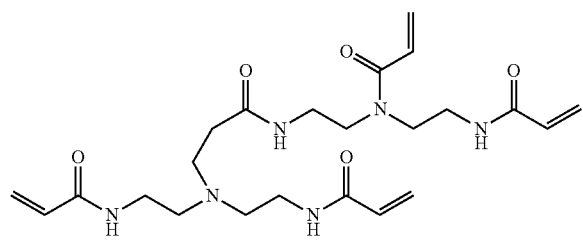
Formula (DA1-3)
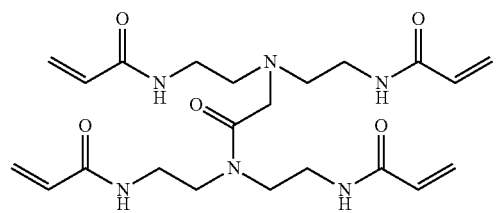
Formula (DA1-4)
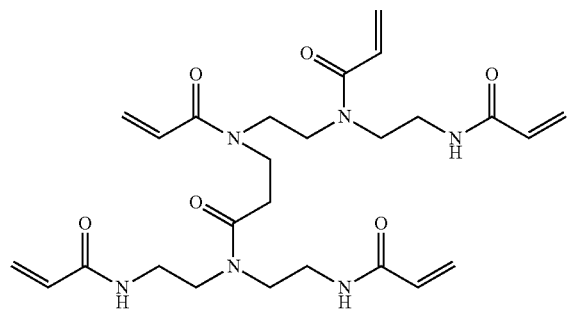
Formula (DA2-1)
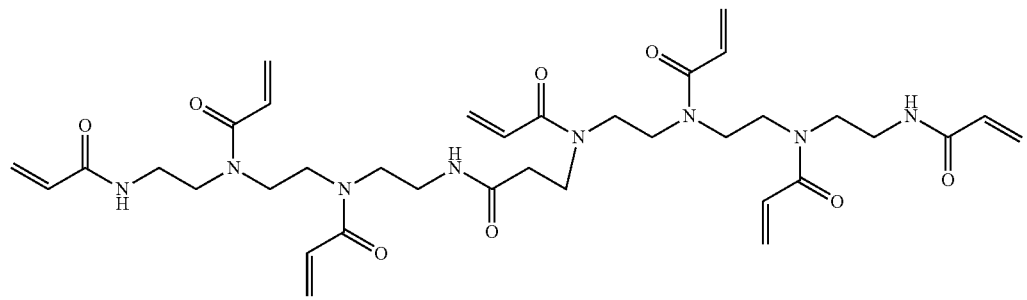
Formula (DA2-2)
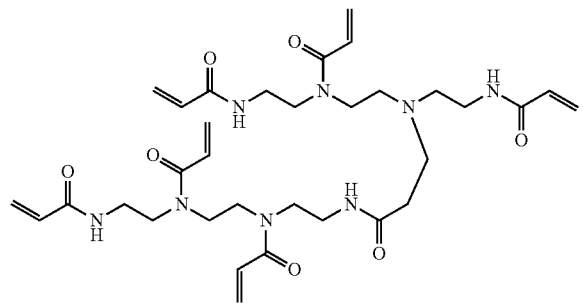
Formula (DA2-3)
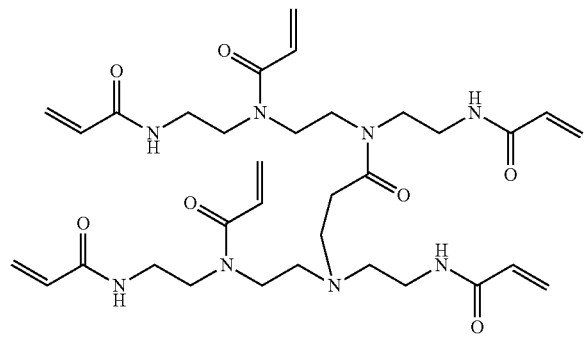

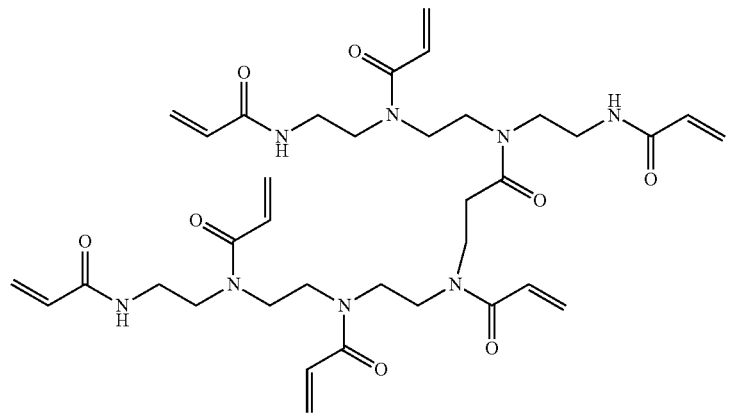
Formula (DA2-4)
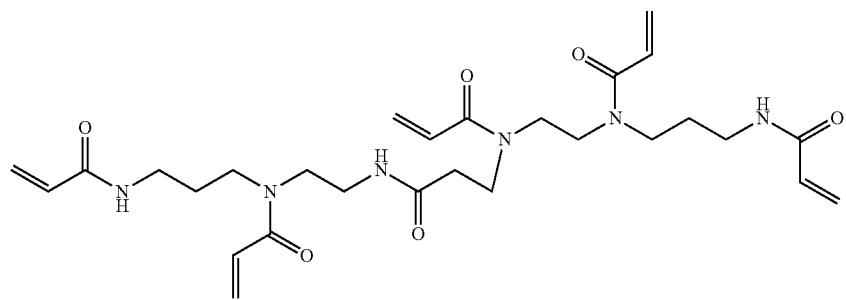
Formula (DA3-1)
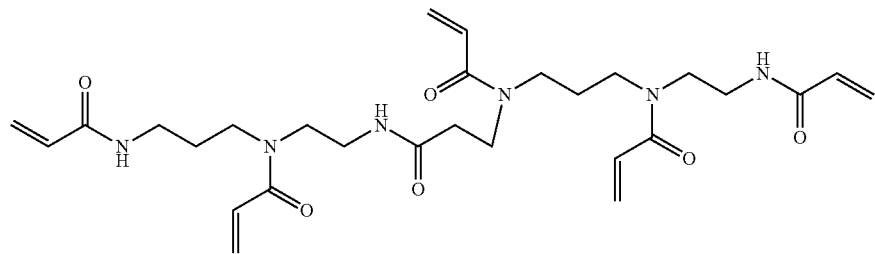
Formula (DA3-2)
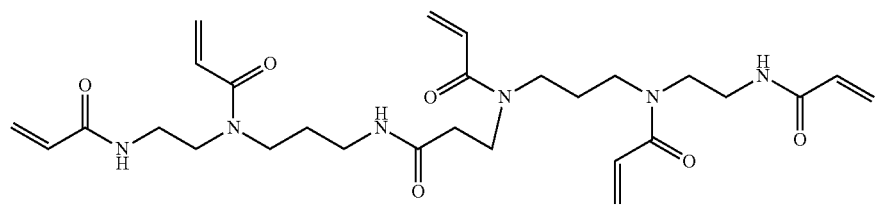
Formula (DA3-3)
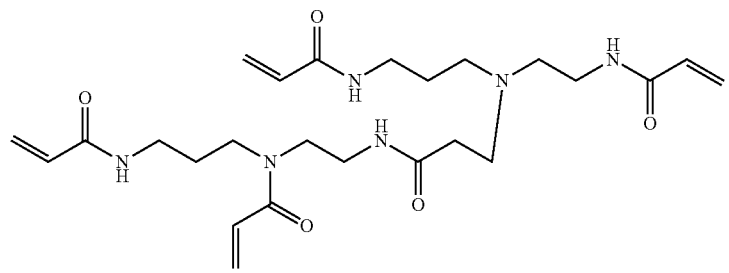
Formula (DA3-4)

-continued
Formula (DA3-5)
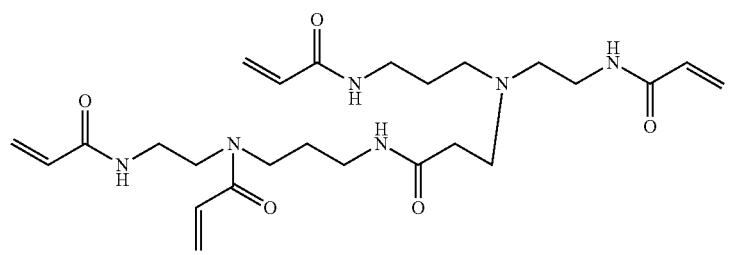
Formula (DA3-6)
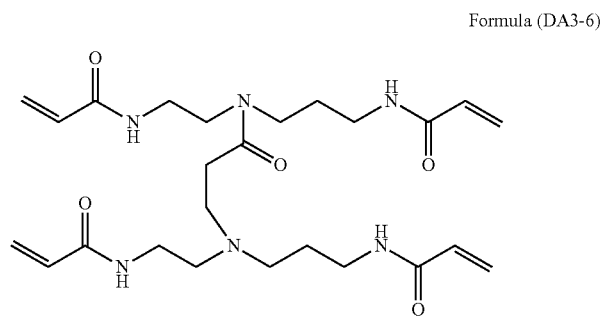
Formula (DA3-7)
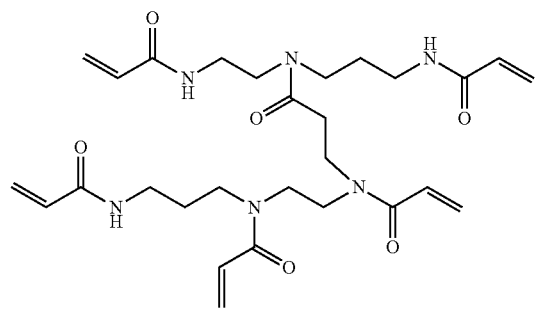
Formula (DA3-8)
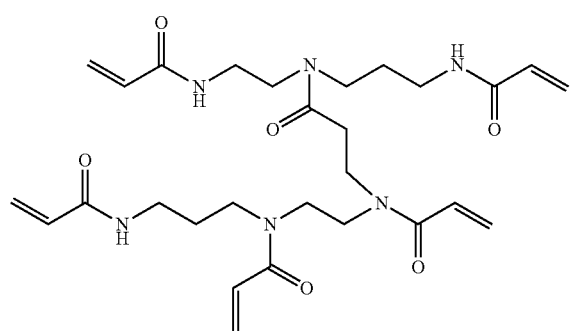
Formula (DA4-1)
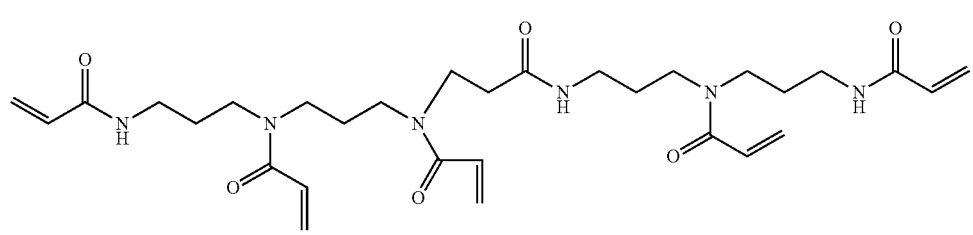
Formula (DA4-2)
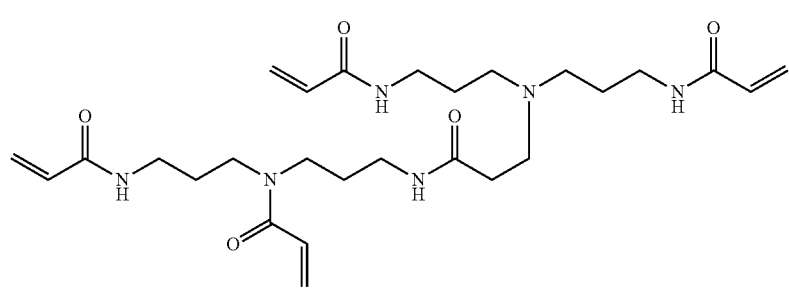

Formula (DA4-3)

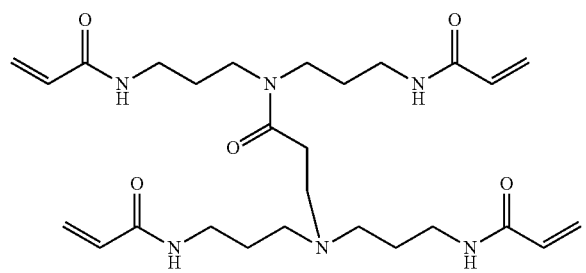

Formula (DA4-4)

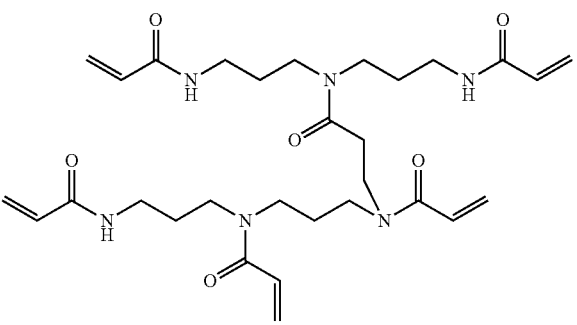

Formula (DB1-1)

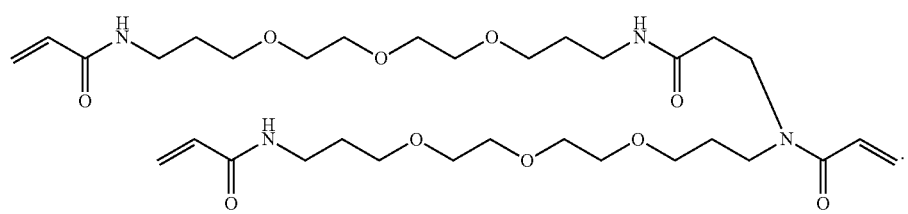

6. The curable composition according to claim 4, wherein any one of the following requirements 1 to 5 is satisfied, requirement 1: the curable composition includes the compound represented by Formula (A-1) as the compound A and includes at least one compound selected from the group consisting of compounds represented by Formulae (DA1-1) to (DA1-4) as the compound X, requirement 2: the curable composition includes the compound represented by Formula (A-2) as the compound A and includes at least one compound selected from the group consisting of compounds represented by Formulae (DA2-1) to (DA2-4) as the compound X, requirement 3: the curable composition includes the compound represented by Formula (A-3) as the compound A and includes at least one compound selected from the group consisting of compounds represented by Formulae (DA3-1) to (DA3-8) as the compound X, requirement 4: the curable composition includes the compound represented by Formula (A-4) as the compound A and includes at least one compound selected from the group consisting of compounds represented by Formulae (DA4-1) to (DA4-4) as the compound X, and requirement 5: the curable composition includes the compound represented by Formula (B-1) as the compound B and includes a compound represented by Formula (DB1-1) as the compound Y, Formula (DA1-1)

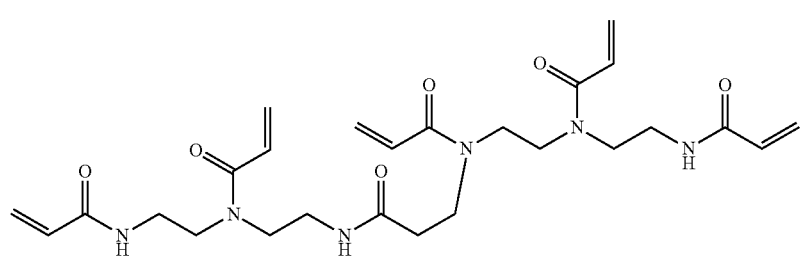

Formula (DA1-2)

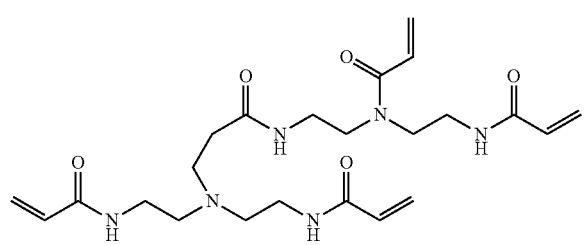

Formula (DA1-3)

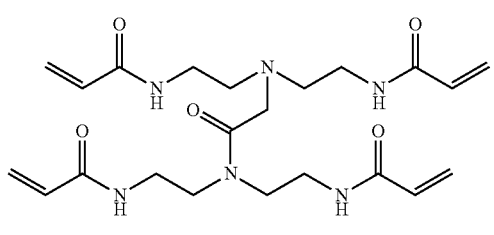

Formula (DA1-4)
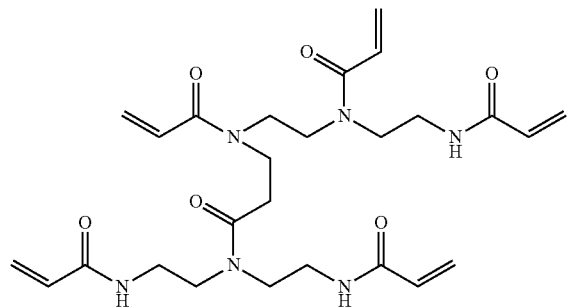
Formula (DA2-1)
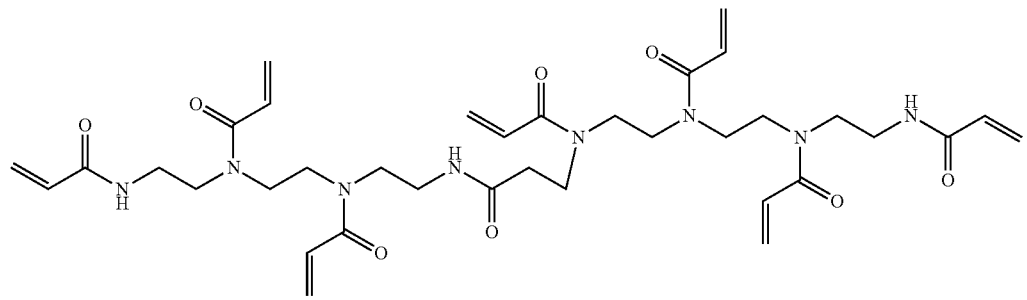
Formula (DA2-2)
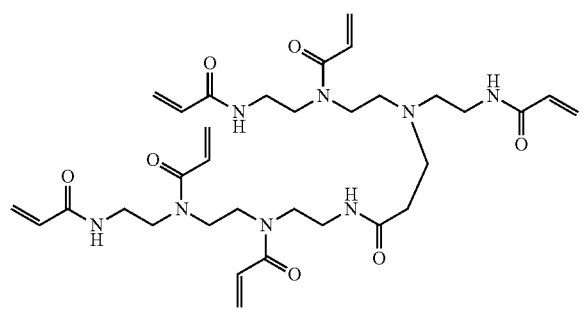
Formula (DA2-3)
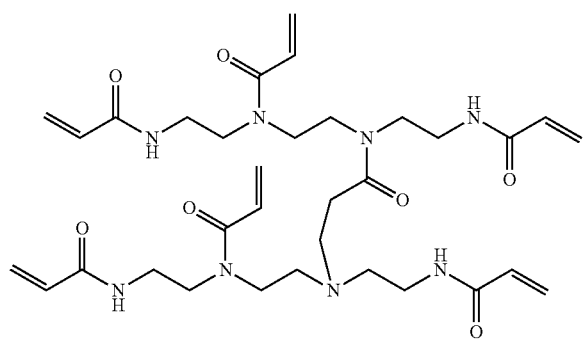
Formula (DA2-4)
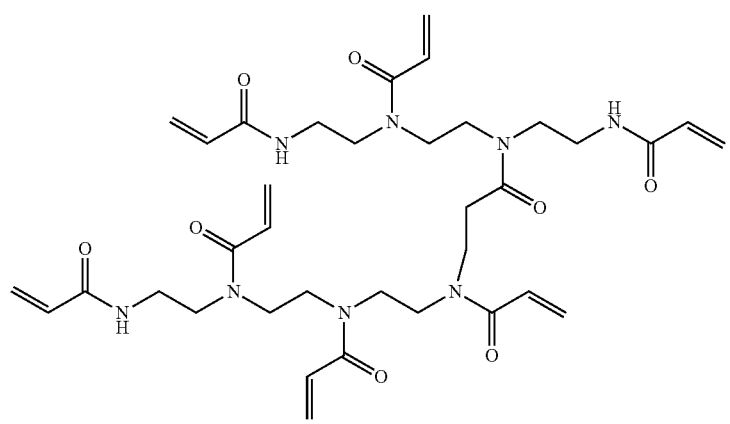

Formula (DA3-1)
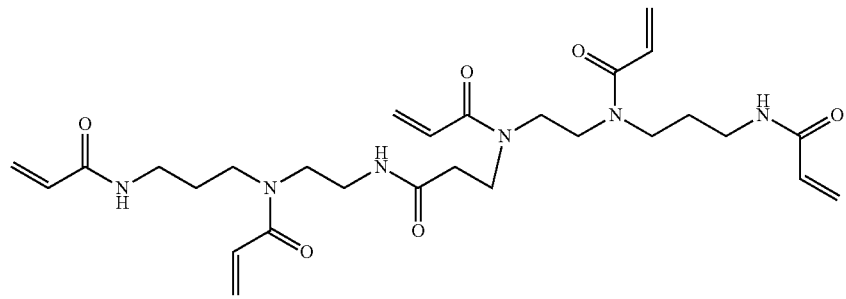
Formula (DA3-2)
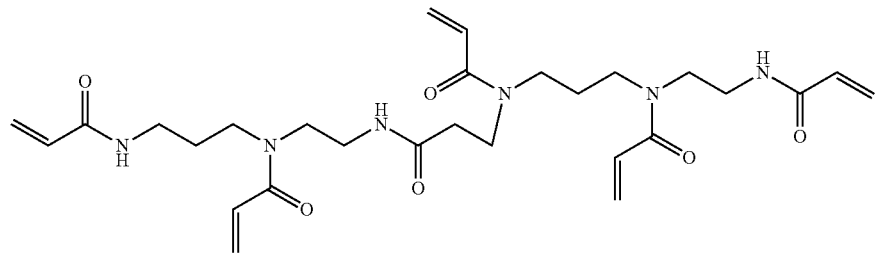
Formula (DA3-3)
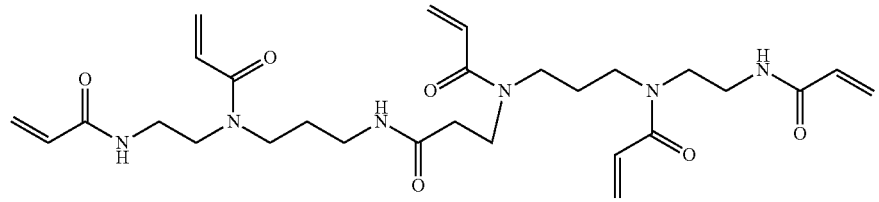
Formula (DA3-4)
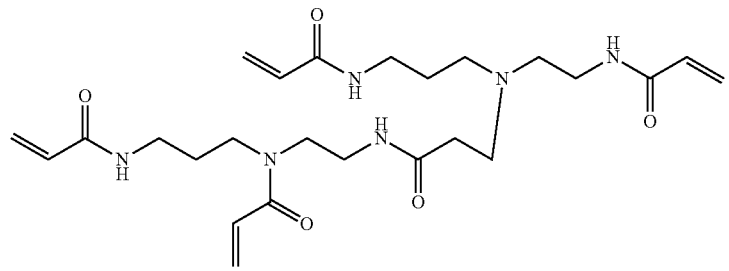
Formula (DA3-5)
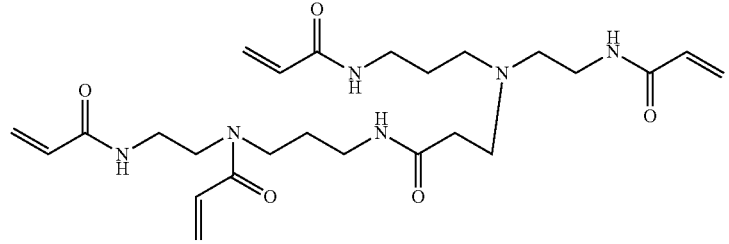
Formula (DA3-6)
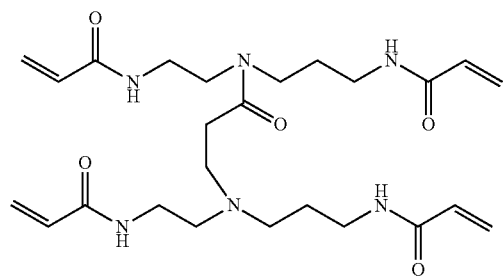
Formula (DA3-7)
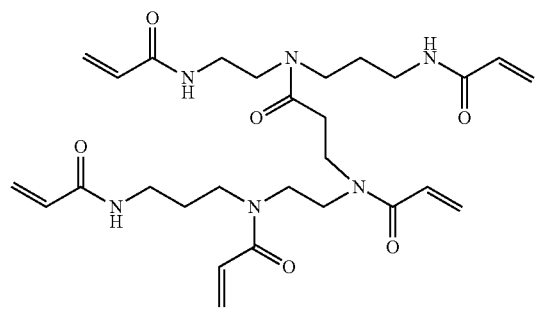

-continued
Formula (DA3-8)
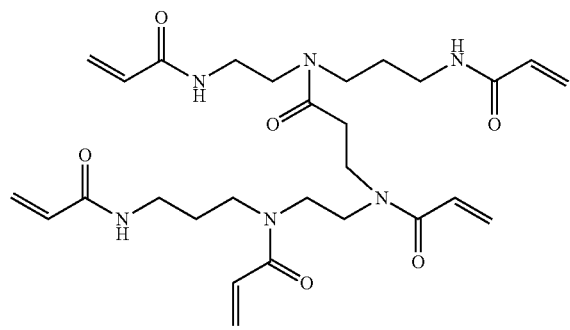
Formula (DA4-1)
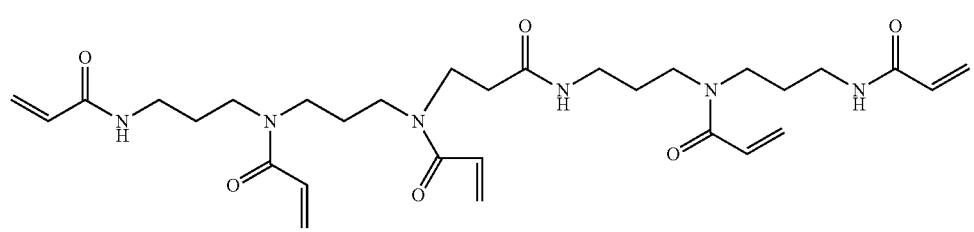
Formula (DA4-2)
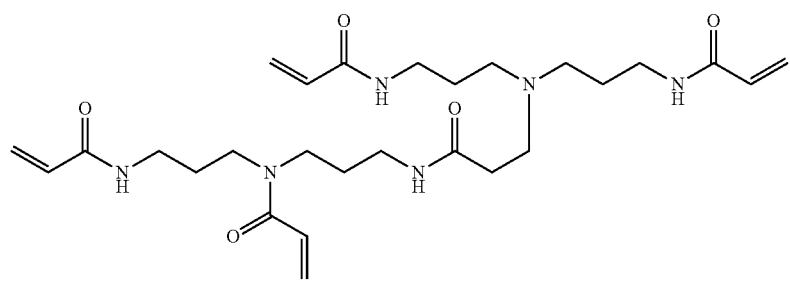
Formula (DA4-3)
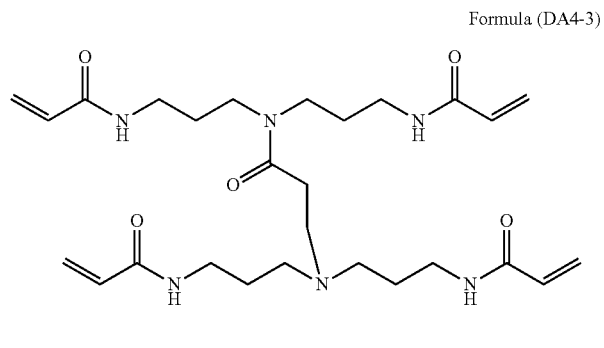
Formula (DA4-4)
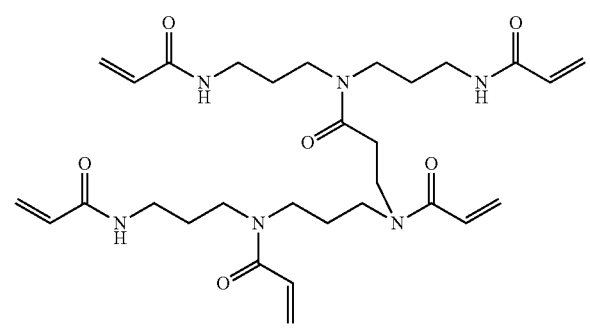

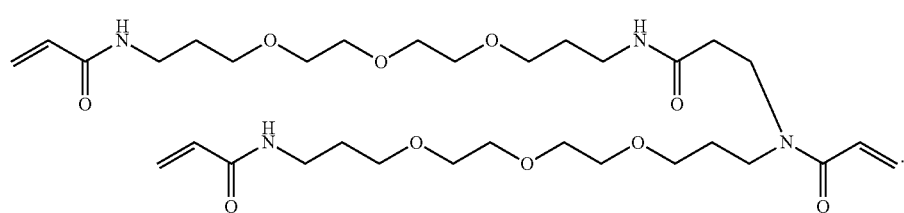
Formula (DB1-1)